: (12) United States Patent
Ohno et al.

(10) Patent No.: US 8,770,741 B2
(45) Date of Patent: Jul. 8, 2014

(54) IMAGE VIEWING GLASSES

(75) Inventors: Hiroshi Ohno, Tokyo (JP); Tatsuya Sakata, Tokyo (JP); Masamichi Okada, Kanagawa (JP); Nobuyuki Hara, Kanagawa (JP); Naoto Shimizu, Tokyo (JP)

(73) Assignee: Sony Corporation (JP)

( * ) Notice: Subject to any disclaimer, the term of this patent is extended or adjusted under 35 U.S.C. 154(b) by 364 days.

(21) Appl. No.: 13/231,057

(22) Filed: Sep. 13, 2011

(65) Prior Publication Data

US 2012/0069294 A1 Mar. 22, 2012

(30) Foreign Application Priority Data

Sep. 21, 2010 (JP) ................................ P2010-210642

(51) Int. Cl.
*G02C 5/22* (2006.01)
(52) U.S. Cl.
USPC ............................................ 351/153; 16/228
(58) Field of Classification Search
CPC ........ G02B 27/017; G02C 25/00; G02C 5/20;
G02C 2200/22; G02C 5/2263; G02C 5/22654;
G02C 5/06; G02C 5/16; G02C 5/22; G02C
5/2272; G02C 5/2281; G02C 9/02
USPC ................... 351/153, 111, 113, 114, 158, 41;
16/228
See application file for complete search history.

(56) References Cited

U.S. PATENT DOCUMENTS 2,756,632 A * 7/1956 Parsell .......................... 351/121
5,276,471 A 1/1994 Yamauchi et al.

FOREIGN PATENT DOCUMENTS

| JP | 04-023581 A | 1/1992 |
| JP | 2001-305475 A | 10/2001 |
| JP | 2006-091641 A | 4/2006 |
| JP | 2007-240700 A | 9/2007 |

* cited by examiner

*Primary Examiner* — Hung Dang
(74) *Attorney, Agent, or Firm* — Lerner, David, Littenberg, Krumholz & Mentlik, LLP

(57) ABSTRACT

A glasses-type shutter holder may include left and right temple parts connected respectively to left and right frame end parts of frame. The left and right temple parts may be foldable respectively with respect to the left and right frame end parts in accordance with movement, for each frame end part and temple part pair, of a contact position at which a movement part provided with one of the temple part and the frame end part of the pair is in contact with a contact part of the other of the temple part and the frame end part of the pair. For each of the pairs, the contact part is in contact with the movement part when the temple part is unfolded to a maximum degree, and a maximum degree of opening of the temple part is varied in accordance with the movement of the movable part.

7 Claims, 24 Drawing Sheets

100

100

100

IMAGE VIEWING GLASSES

CROSS-REFERENCE TO RELATED APPLICATIONS

This application claims priority from Japanese Patent Application No. 2010-210642 filed in the Japan Patent Office on Sep. 21, 2010, the entire contents of which is hereby incorporated by reference.

BACKGROUND

The present disclosure relates to image viewing glasses such as image viewing glasses used to view a stereoscopic image realized by displaying right and left images in a time division manner.

In order to view a stereoscopic image, users generally wear a glasses-type holder on their heads, which displays right-eye images and left-eye images and includes two polarizing plates with different polarizing angles or two liquid crystal shutters alternately switching polarization states in synchronization with right and left images. Moreover, a head-worn display device is generally used to view a virtual reality image or to directly view a small-sized liquid crystal panel image via an optical system such as a mirror.

For example, there has been suggested an image display device in which alignment between the positions of the eyes and an optical axis is gauged by temple parts (ear hooking parts) of a frame and nose pad parts (holding parts) coming into contact with the nose of the user to hold a glasses frame (for example, see Japanese Unexamined Patent Application Publication No. 2001-305475). Moreover, there has been suggested an image display device in which slide mechanisms changing the width of the temples are provided in the upper portion of the glasses-type holder so that users with different sizes of their heads can wear the glasses-type holder and a wearing sensation is improved (for example, see Japanese Unexamined Patent Application Publication No. 4-23581).

In most of the nose pad parts of the frame of typical vision correcting glasses, slim pad arms are joined to a rim part by soldering. However, there has been suggested a nose pad support body in which nose pads mounted in an exchangeable manner can be exchanged (for example, see Japanese Unexamined Patent Application Publication No. 2007-240700). In many cases, the nose pad parts are fixed to a glasses frame (rim part) and are disposed in the upper portion of the nose (near the edges of the eyes) without particularly protruding from the outside shape of the lens frame. Moreover, there has been suggested a glasses component in which the nose pad parts have a saddle shape and an attachment itself made of resin can be exchanged detachably (for example, see Japanese Unexamined Patent Application Publication No. 2006-91641).

However, a general glasses frame or a general temple part is made of metal (alloy of nickel and titanium, gold, shape memory alloy, or the like) or plastic (acetate material or super-elastic resin). In order to carry out minute adjustment (plastic deformation) of the shape, a specialized technique or device and a jig have to be used.

In order to view a stereoscopic image, users have to wear a glasses-type holder on their heads, which displays right-eye images and left-eye images and includes two polarizing plates with different polarizing angles or two liquid crystal shutters alternately switching polarization states in synchronization with right and left images. In order for the glasses-type holder to function as an accessory of a television, one accessory glasses-type holder has to be used for users such as a male, a female, an adult, and a child with different sizes of their heads as well as a user wearing vision correcting glasses.

However, there is no technique capable of enabling the users with various sizes of their heads to wear the glasses-type holder in the above-described techniques according to the related art. In the image display device improved in a wearing sensation (for example, see Japanese Unexamined Patent Application Publication No. 4-23581), a temple width varying mechanism is provided to vary the width of the temples for the width of a head. However, since there is a problem with weight saving, it is not preferable to provide a complicated movable mechanism in the upper portion of the glasses-type holder. Moreover, there is no consideration of a user carrying out minute adjustment of the shape occurring due to plastic deformation from the initial shape of the temple parts (ear hooking parts) or the nose pad parts, or the like so as to correspond to the widths of the heads of other users without a specially trained operator, a specialized device, or a jig, when carrying out fitting (glasses adjustment) of the general vision correcting glasses holder itself.

It is desirable to provide image viewing glasses which display right-eye images and left-eye images and include two polarizing plates with different polarization angles or two liquid crystal shutters alternately switching polarization states in synchronization with right and left images in order to view a stereoscopic image.

Moreover, it is desirable to provide novel and improved image viewing glasses capable of being mounted in correspondence with the various sizes of heads to view a stereoscopic image or the like.

SUMMARY

In accordance with one embodiment of the disclosure, a glasses-type shutter holder may include a frame having left and right openings adjacent left and right frame end parts, respectively. The holder may include left and right temple parts connected respectively to the left and right frame end parts in a configuration such that the left and right temple parts are foldable respectively with respect to the left and right frame end parts in accordance with movement, for each frame end part and temple part pair, of a contact position at which a movement part provided with one of the temple part and the frame end part of the pair is in contact with a contact part of the other of the temple part and the frame end part of the pair. Further, for each of the pairs, the contact part may be in contact with the movement part when the temple part is unfolded to a maximum degree, and a maximum degree of opening of the temple part may be varied in accordance with the movement of the movable part.

According to the embodiments of the disclosure, it is possible to provide the novel and improved image viewing glasses capable of being mounted in correspondence with the various sizes of the heads to view the images.

According to the embodiments of the disclosure, it is possible to provide the novel and improved image viewing glasses which users can appropriately wear on top of typical vision correcting glasses in an overlapping manner to view a stereoscopic image or the like.

The features and advantages of the embodiments of the disclosure are apparent from the accompanying drawings and the detailed description of the embodiments of the disclosure.

DETAILED DESCRIPTION OF EMBODIMENTS

Figure 1:
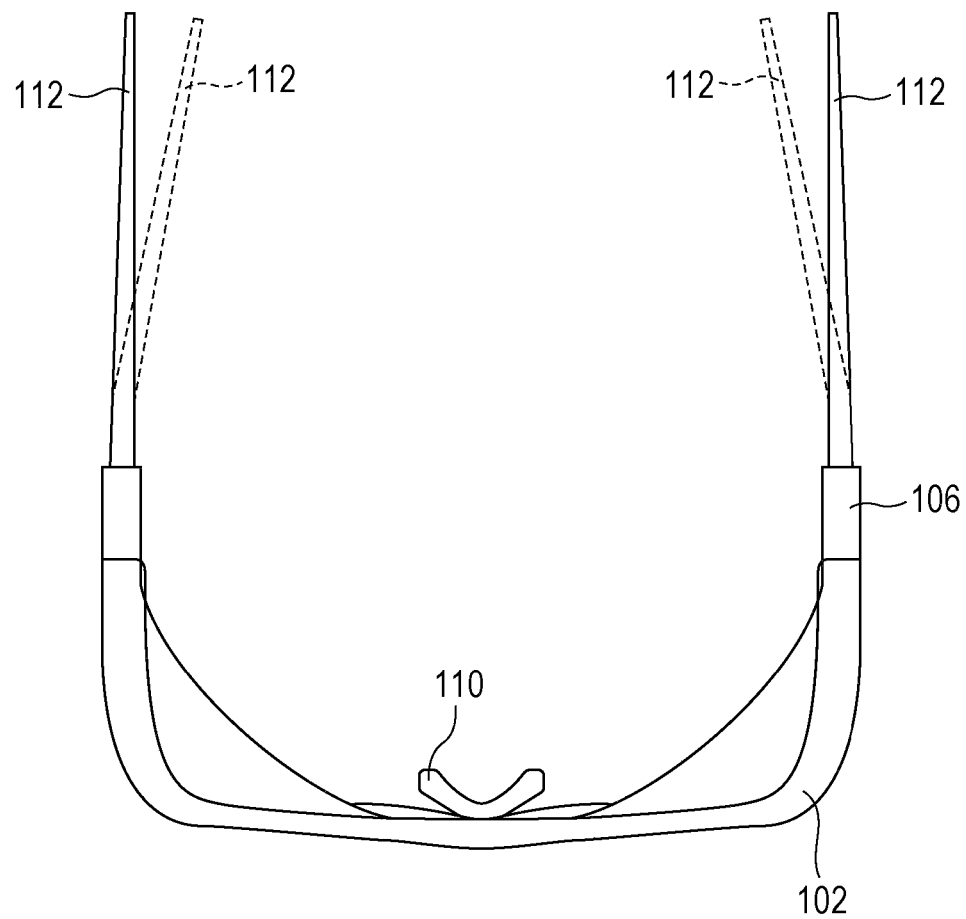
FIG. 1 is a top view of a glasses-type liquid crystal shutter holder when viewed from the upper side.

Hereinafter, a preferred embodiment of the disclosure will be described in detail with reference to the drawings. The same reference numerals are given to constituent elements having the same actual function throughout the specification and the drawings and the description thereof will not be repeated.

Figure 2:
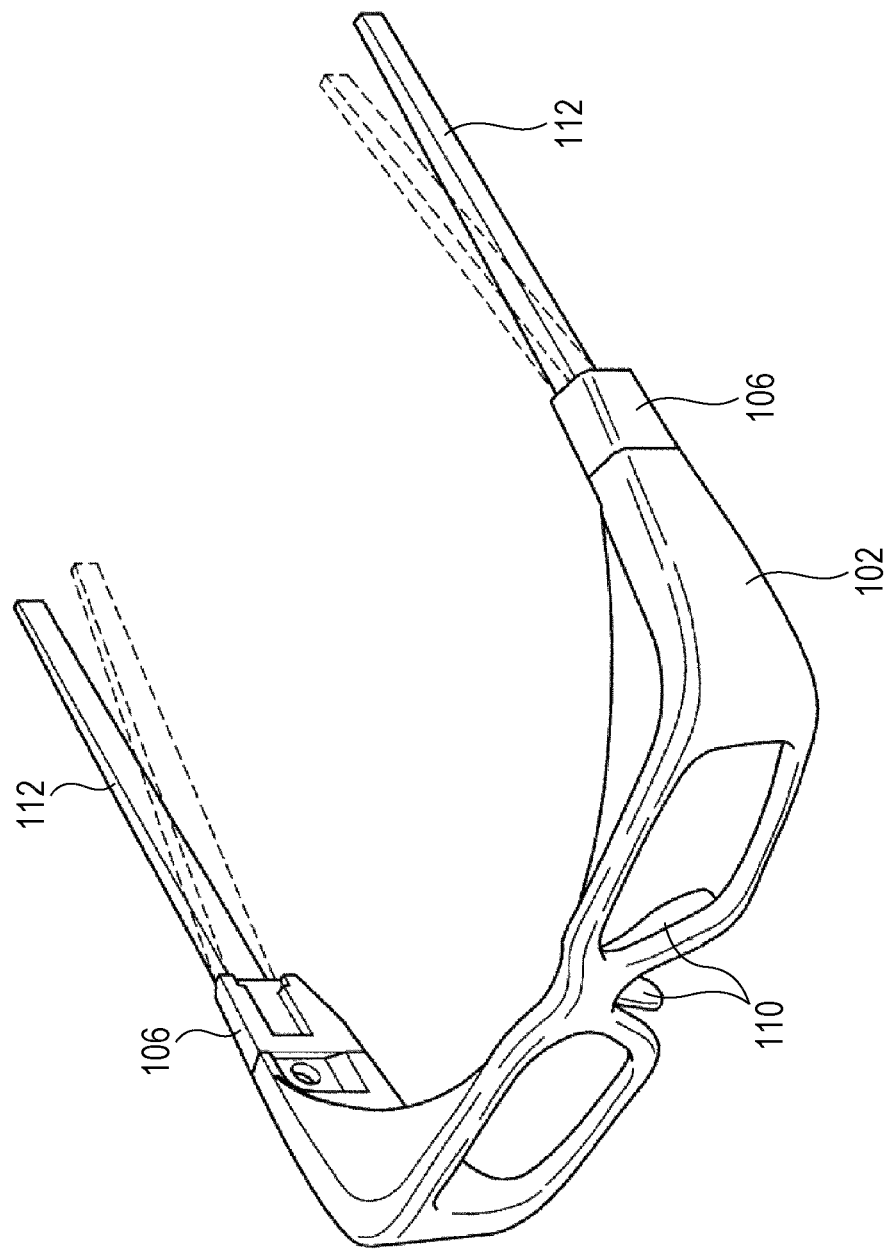
FIG. 2 is a perspective view of the glasses-type liquid crystal shutter holder.
Figure 3:
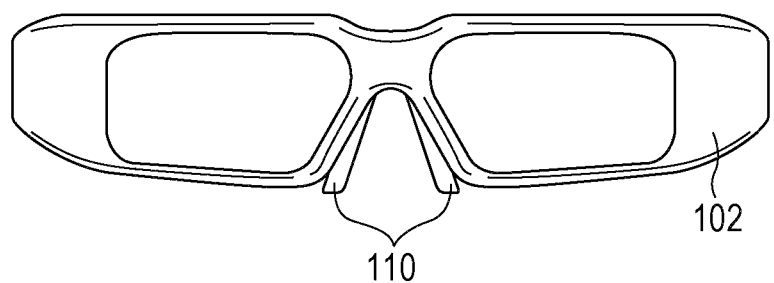
FIG. 3 is a front view of the glasses-type liquid crystal shutter holder.
Figure 4:
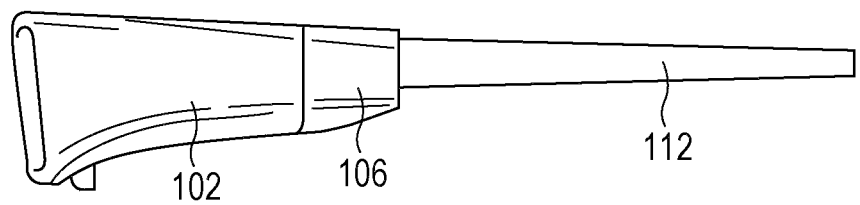
FIG. 4 is a right side view of the glasses-type liquid crystal shutter holder.

The description will be made in the following order.
1. Example of Configuration of Shutter Glasses
2. Angle Adjustment Structure of Temple
3. Fitting of Glasses
4. Another Example of Configuration of Shutter Glasses 1. Example of Configuration of Shutter Glasses In FIGS. 1 to 5, the configuration of a glasses-type liquid crystal shutter holder (liquid crystal shutter glasses) 100 is schematically illustrated according to an embodiment of the disclosure. A user wears the illustrated glasses-type liquid crystal shutter holder 100 on his or her head, when the user views a display (display device) displaying right and left eye images and right eye images to view a 3D (stereoscopic) image. In the glasses-type liquid crystal shutter holder 100, two polarizing plates with different polarization angles and two liquid crystal shutters capable of alternately switching polarization states in synchronization with right and left images are accommodated in a glasses frame 102. The glasses-type liquid crystal shutter holder 100 has an infrared detection unit detecting infrared rays transmitted from a display (not shown), a liquid crystal shutter driving circuit, and electric and electronic components, such as a battery driving the circuit. FIG. 1 is a top view of the glasses-type liquid crystal shutter holder 100, when viewed from the upper side. FIG. 2 is a perspective view of the glasses-type liquid crystal shutter holder 100. FIG. 3 is a front view of the glasses-type liquid crystal shutter holder 100. FIG. 4 is a right side view of the glasses-type liquid crystal shutter holder 100.

The user wears the glasses-type liquid crystal shutter holder 100 according to this embodiment on top of typical vision correcting glasses in an overlapping manner, when the user wears the general vision correction glasses. Moreover, the glasses-type liquid crystal shutter holder 100 is configured so that users from an adult to a child with various head types or various sizes of faces can wear the glasses-type liquid crystal shutter holder 100.

In FIG. 1, the entire glasses-type liquid crystal shutter holder 100 is illustrated. Both right and left end portions (armors) of the glasses frame 102 molded of a resin material are formed so as to have a curved surface. The right and left end portions are connected to right and left temple holders 106 via hinge portions, respectively. Each temple holder 106 can be folded through the hinge portion.

Nose pad parts 110 are fixed to the glasses frame 102. The nose pad parts 110 are put on both sides of the nose of the user wearing the glasses-type liquid crystal shutter holder 100 so as to fix the glasses-type liquid crystal shutter holder 100. In the illustrated example, the nose pad parts 110 each having a saddle shape are configured to come into contact with the nose near the middle of the nose so as not to interfere with the nose pad parts of the vision correcting glasses worn inside the glasses-type liquid crystal shutter holder 100. On the other hand, the nose pad parts of the vision correcting glasses generally come into contact with the upper portion (the position of the edge of the eye) of the nose which is closest to the right and left eyes so as not to be exposed to the outside as much as possible. Regarding the material of the nose pad parts 110, a metal spring material such as stainless steel is used as the core material and the surface of the core material is molded and coated with a flexible resin. The nose pad parts 110 with such a configuration are configured so as to be adjusted minutely so that the pad surfaces (contact inclined surfaces) on the nose and the pressure to the nose correspond to individual users by imposing the load so as to be uniform plastic deformation. Moreover, the nose pad parts 110 have the function of avoiding marks occurring when the nose is pressed down and the function of maintaining a stable wearing state.

The temple 112 is integrally molded together with the temple holder 106 or is coupled with the temple holder 106 by a screw or the like. Regarding the material of the temple 112, a metal spring material such as stainless steel is used as the core material and the shape of the temple end portion (near modern portion) touching the back of the head or an ear can be minutely adjusted. In this embodiment, the wearing sensation can be improved by changing the width of the temple through the use of a rotational ratchet mechanism or the like described below and also by the user minutely adjusting the temple.

2. Angle Adjustment Structure of Temple

Figure 5:
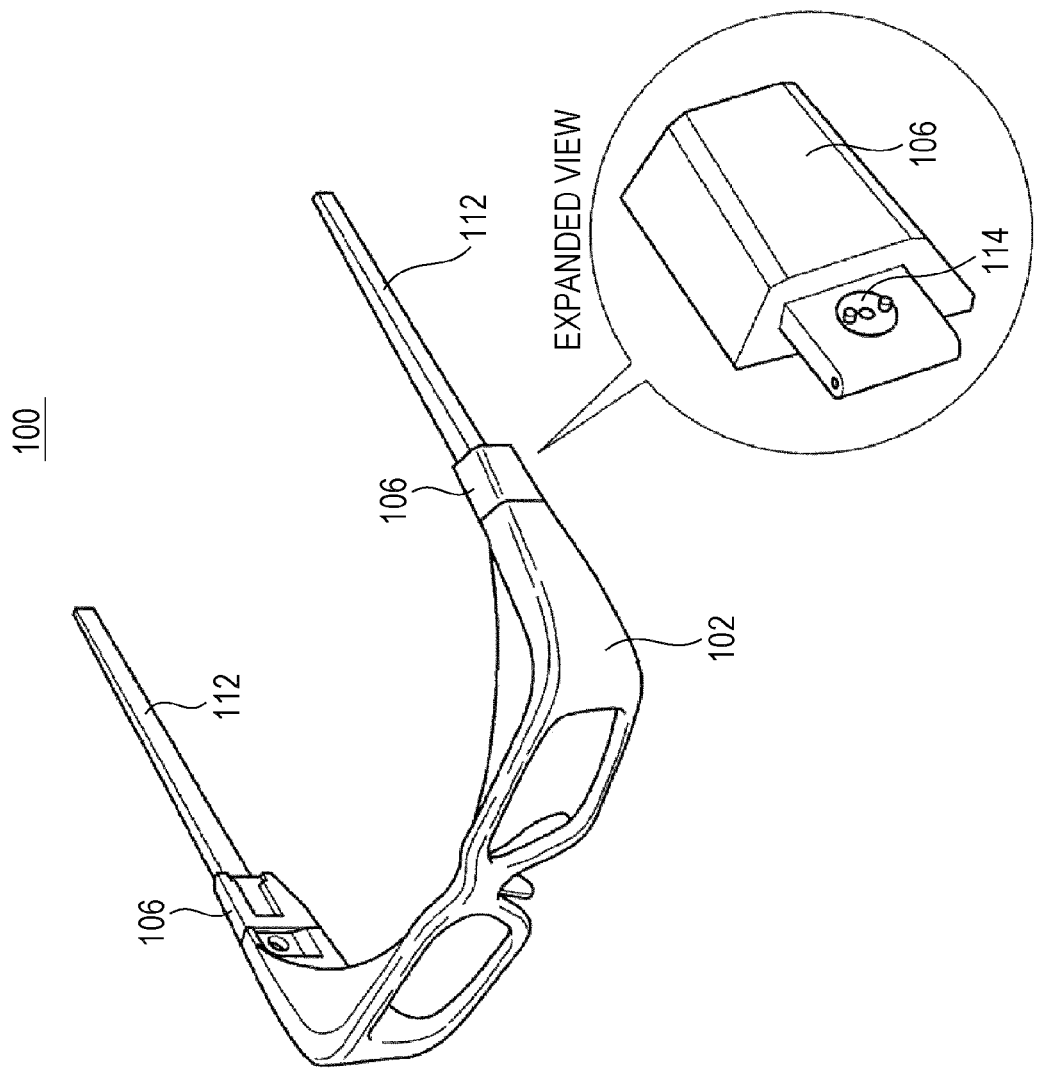
FIG. 5 is a perspective view of the glasses-type liquid crystal shutter holder and a separately expanded temple holder.
Figure 6:
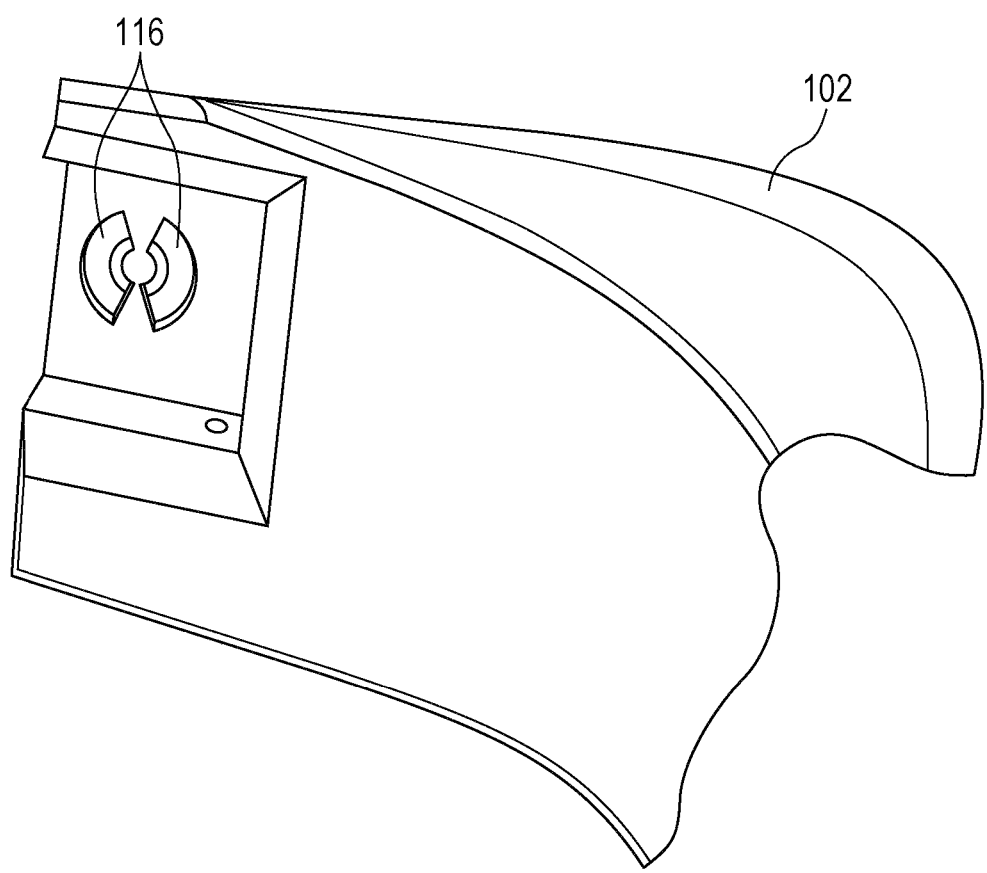
FIG. 6 is a schematic diagram of a part on which the temple holder of the glasses frame is mounted, when viewed from the inside of the glasses frame.

Next, the angle adjustment structure of the temple 112 will be described. FIG. 5 is a perspective view of the glasses-type liquid crystal shutter holder 100 and a diagram (expanded view) of the separately expanded temple holder 106. FIG. 6 is a diagram illustrating a part on which the temple holder 106 of the glasses frame 102 is mounted, when viewed from the inside of the glasses frame 102.

As shown in FIG. 5, a columnar rotational member 114 is mounted on the temple holder 106. The rotational member 114 is configured so as to be rotated at the central axis as the rotational axis. As shown in FIG. 6, in a part on which the temple holder 106 of the glasses frame 102 is mounted, each groove (concave portion) 116 is formed at the position corresponding to the rotational member 114. As shown in FIG. 6, the grooves 116 are formed in an arc shape about the rotational center of the rotational member 114. The two grooves 116 with the same shape are formed at the positions at which the grooves 116 face each other at 180 degrees with respect to the rotational center of the rotational member 114. The depth of the groove 116 is configured so as to be changed step by step in the circumferential direction of the arc.

Figure 7A:
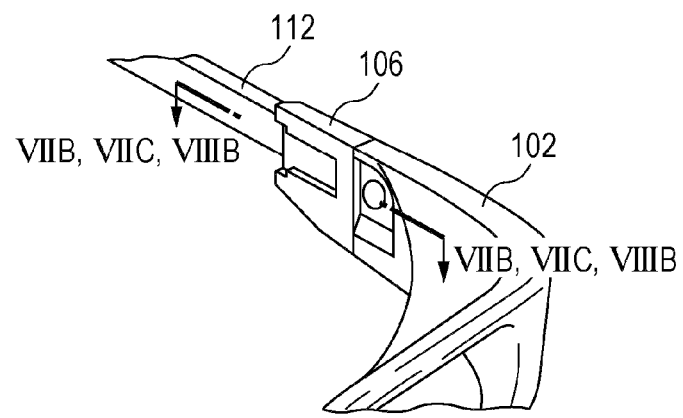
FIG. 7A is a schematic diagram of a detailed angle adjustment structure of the temple.
Figure 7B:
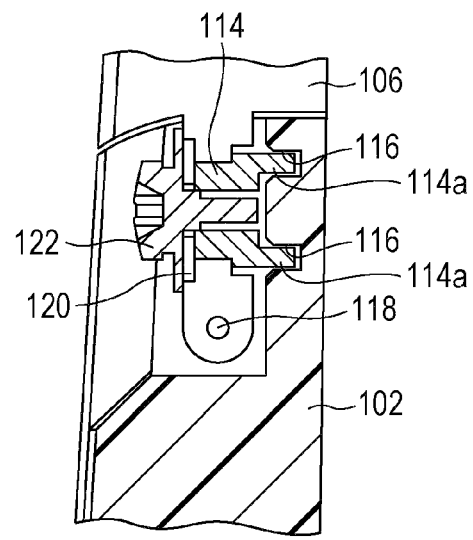
FIG. 7B is a schematic diagram of the detailed angle adjustment structure of the temple.
Figure 7C:
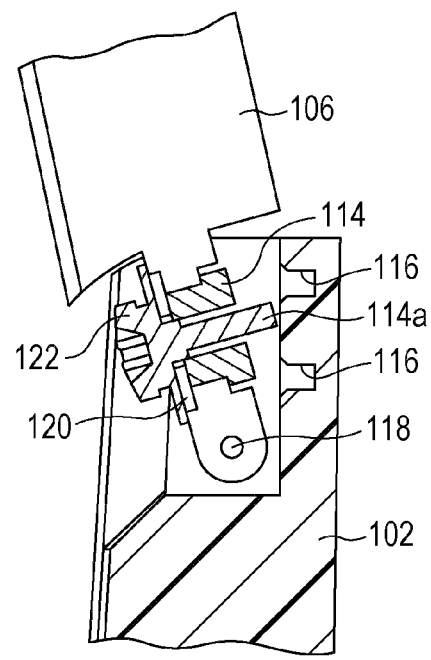
FIG. 7C is a schematic diagram of the detailed angle adjustment structure of the temple.

FIGS. 7A to 7C are schematic diagrams of the detailed angle adjustment structure of the temple. FIG. 7A is a perspective view of a connection section between the glasses frame 102 and the temple holder 106. FIGS. 7B and 7C are schematic diagrams taken along the chain line VIIB-VIIB, VIIC-VIIC, or VIIIB-VIIIB of FIG. 7A. In FIG. 7B, a protrusion 114a of the rotational member 114 is located at the position of the concave portion 116. In FIG. 7C, the protrusion 114a of the rotational member 114 is located at a part in which the concave portion 116 is not formed.

As shown in FIGS. 7B and 7C, the temple holder 106 is rotatable about a rotation shaft 118 with respect to the glasses frame 102 and the hinge portion is configured by the rotation shaft 118. Thus, the temple holder 106 and the temple 112 can be folded through the hinge portion.

A screw 122 is fastened on a rotational member (cam) 114 with a plate spring 120 interposed therebetween, such that the rotational member 114 is mounted on the temple holder 106. Thus, the rotational member 114 is rotatable with respect to the temple holder 106 against a sliding resistance of the plate spring 120. When the angle position of the rotational member 114 is determined, the position of the rotational member 114 is maintained by the resistance occurring when a slide piece 120 with a plate spring shape slides. In the ends of the rotational member 114, the two protrusions 114a are formed at the positions at which the protrusions 114a face each other at 180 degrees.

The two grooves 116 of the glasses frame 102 are formed along the trajectories of the protrusions 114a when the rotational member 114 is rotated. When the protrusions 114a are located at the deepest portions of the grooves 116 along the angle position of the rotational member 114, as shown in FIG. 7B, the protrusions 114a are completely inserted into the grooves 116. Therefore, the opening angle of the temple holder 106 becomes the maximum. When the protrusions 114a are located at the portion, in which the grooves 116 are not formed, along the angle position of the rotational member 114, as shown in FIG. 7C, the protrusions 114a come into contact with the plane in which the grooves 116 are not formed. Thus, the opening of the temple holder 106 becomes the minimum.

The depth of the groove 116 is configured to be different for each predetermined angle. For example, a minus (−) shape groove is formed in the head of the screw 122. Thus, both the screw 122 and the rotational member 114 can be rotated by engaging a driver, a coin, or the like into the groove and rotating the screw 122. For example, when the protrusions 114a are located at the deepest portions of the grooves 116, the positions of the protrusions 114a are moved to the positions, at which the depth of the grooves 116 is shallower, by rotating the screw 122 by 60 degrees. When the positions of the protrusions 114a are located at the positions at which the depth of the grooves 116 is shallower, for example, the depth of the grooves 116 can be set so that the opening angle (the angle of the hinge) of the temple holder 106 becomes narrower by about 2.5 degrees. When the protrusions 114a come into contact with the plane in which the grooves 116 are not formed, the depth of the grooves 116 can be set so that the opening angle (the angle of the hinge) of the temple holder 106 is decreased further by about 2.5 degrees. Thus, the opening angle (about 5 degrees) of the temple 112 can be adjusted in two steps and the width of the two right and left temples 112 can be adjusted so as to be narrower than the initially set width.

In the above-described example, the two protrusions 114a are formed in the rotational member 114. However, the number of protrusions 114a may be one, or three or more. The mechanism adjusting the opening angle of the temple 112 in the above-described rotational member 114 is just an example. Instead, the same function can be achieved even in a structure in which slide pieces are inserted and a mountain-shaped portion with a plurality of apexes is inserted and extracted.

Figure 8A:
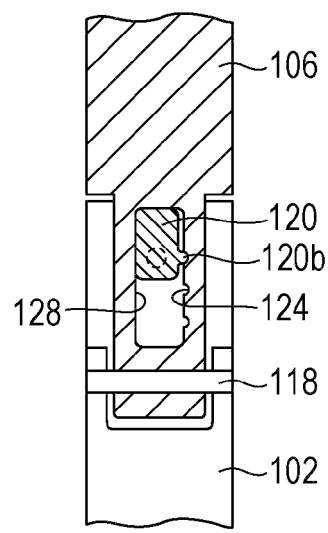
FIG. 8A is a schematic diagram of an example of an adjustment mechanism including a slide piece.
Figure 8B:
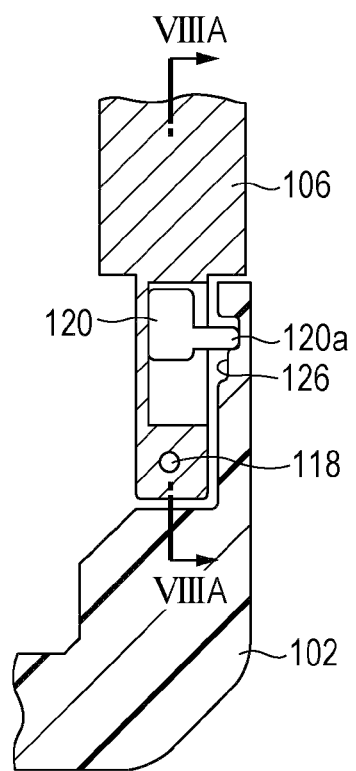
FIG. 8B is a schematic diagram of the example of an adjustment mechanism including a slide piece.

FIGS. 8A and 8B are schematic diagrams of an example of an adjustment mechanism including a slide piece. In FIG. 8B, the cross-sectional surface at the position taken along the chain line VIIB-VIIB, VIIC-VIIC, or VIIIB-VIIIB of FIG. 7A is schematically illustrated, as in FIGS. 7B and 7C. In FIG. 8A, the cross-sectional surface at the position taken along the chain line VIIIA-VIIIA of FIG. 8B is schematically illustrated.

As shown in FIG. 8A, an opening 128 is formed in the end portion of the temple holder 106 and a slide piece 120 is inserted in the opening 128. In the opening 128, the slide piece 120 is configured to reciprocate in the direction of the chain line VIIIA-VIIIA. The slide pieces 120 are provided with a protrusion 120a which is formed at the position facing the glasses frame 102. A groove 126 with depths changed step by step in the movement direction of the protrusion 120a is formed on the face facing the slide piece 120 of the glasses frame 102. A protrusion 120b is formed on the side surface of the slide piece 120 in the width direction of the slide piece 120. The protrusion 120b engages with one of a plurality of concave portions 124 formed to correspond to the depths of the groove 126.

With such a configuration, when the slide piece 120 is slid, the protrusion 120b engages with one of the concave portions 124 so that the position of the slide piece 120 is defined.

Moreover, since the depth in which the protrusion 120*a* comes into contact with the groove 126 is changed in accordance with the position of the slide piece 120, the opening angle of the temple 112 can be adjusted, as in the case shown in FIGS. 7A to 7C.

With such a configuration, for example, when the width and length of the temple are initially set to 175 mm and 130 mm, respectively, and the depths of the groove 126 are set in three steps, the width of the temple can be reduced to 164 mm by first step adjustment (adjustment of 2.5 degrees). Moreover, the width of the temple can be set to 153 mm by second step adjustment. Furthermore, the width of the temple can be reduced to 141 mm by third step adjustment. In this way, a user such as a child with a small head can wear the glasses-type liquid crystal shutter holder 100. By adjusting the nose pad parts 110 and the width of the temple, the temple spring pressure can be applied so that the users with the different sizes of their heads can wear stably wear the glasses-type liquid crystal shutter holder 100 without feeling discomfort. The temple spring pressure is preferably in the range from about 80 grams to 120 grams. The recommended weight is an average value of the results obtained from wearing tests of a plurality of users.

Moreover, since the width of the temple width can be adjusted by the rotational member 114, an excessive temple spring pressure can be prevented from being imposed, compared to a case where the adjustment is carried out only by the elasticity of the temple 112.

3. Fitting of Glasses

Figure 10:
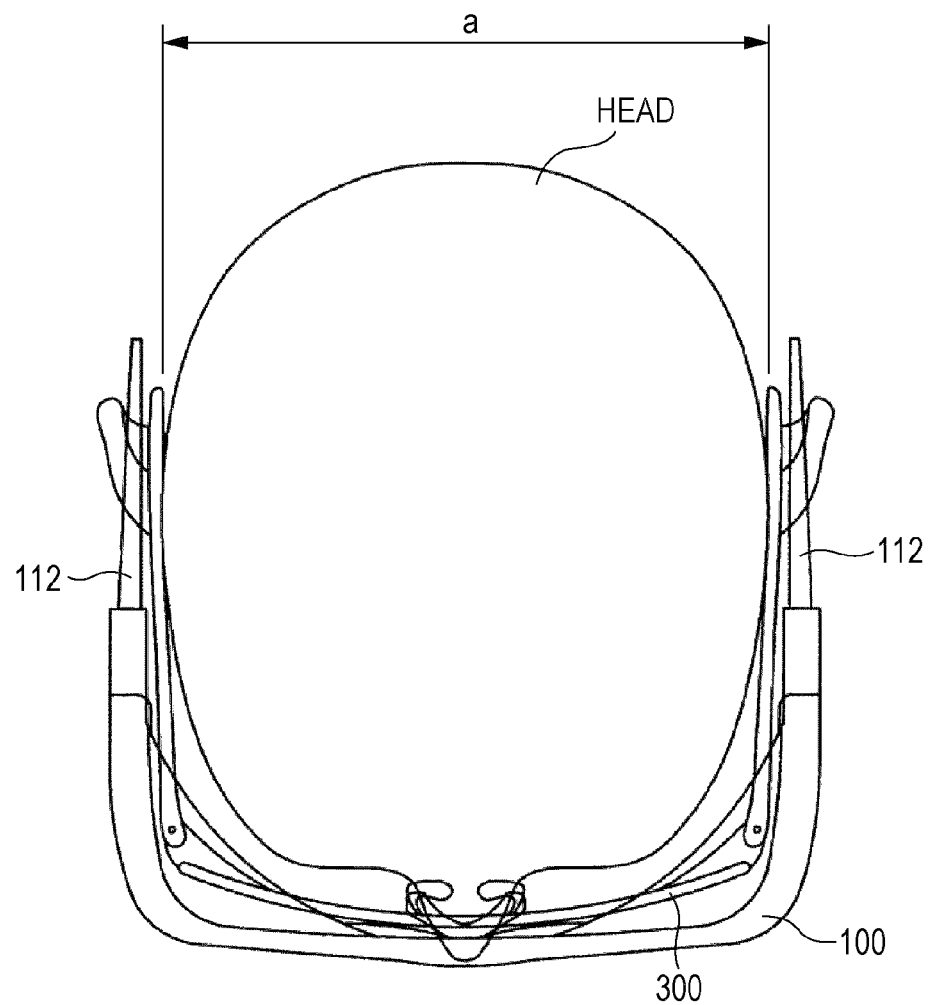
FIG. 10 is a schematic diagram of a standard size of vision correcting glasses.
Figure 11:
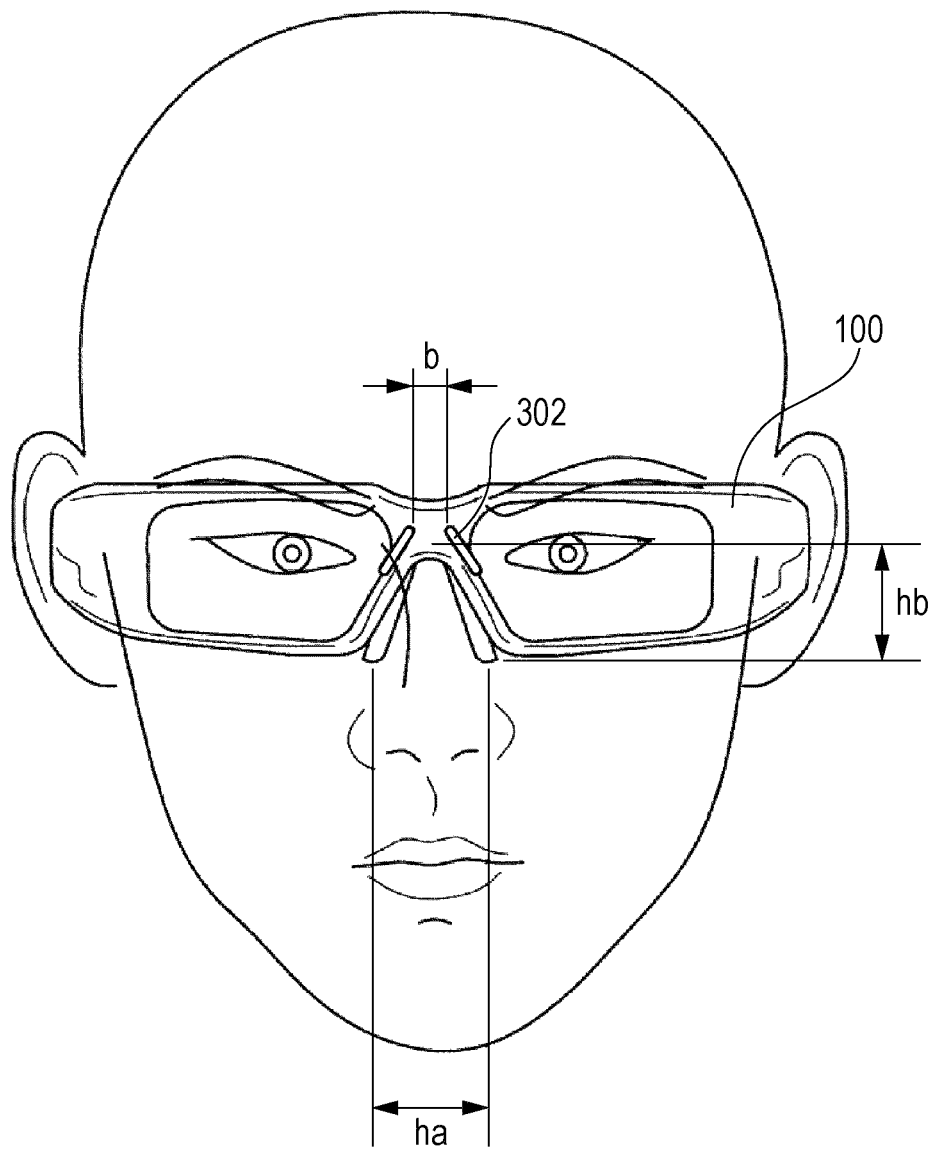
FIG. 11 is a schematic diagram of the standard size of the vision correcting glasses.
Figure 12:
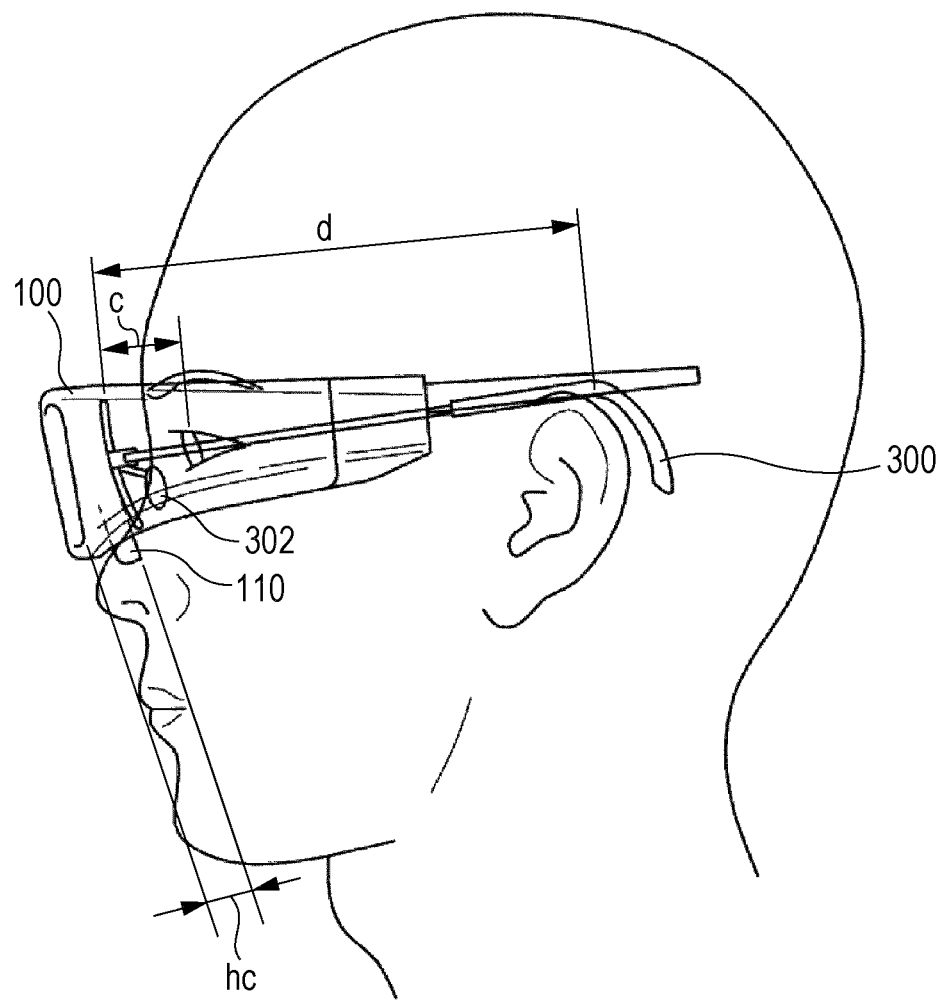
FIG. 12 is a schematic diagram of the standard size of the vision correcting glasses.

FIGS. 10 to 12 are schematic diagrams of a standard size of vision correcting glasses. In FIGS. 10 to 12, the glasses-type liquid crystal shutter holder 100 is mounted so as to overlap with vision correction glasses 300 over the upper side. In FIG. 10, a distance a is a statistical size of the widths of heads. The average value of adult males and females is in the range from 160 mm to 152 mm. The maximum and minimum values of the distance a are about 174 mm and about 140 mm, respectively. A variable width is 34 mm. In order to improve the wearing sensation of a plurality of users with different sizes of their heads when only one glasses holder is used, the variable width has to be set by the adjustment of the width of the temple to some degree.

In FIG. 11, a distance b is the width between right and left nose pad parts 302 of the vision correcting glasses and depends on the sizes of the glasses lenses of the vision correcting glasses or the design shape of the glasses frame. The average value of the distances between pupils is in the range from 61 mm to 64 mm. The maximum and minimum values of the distances between pupils are 71 mm and 61 mm, respectively. The width (mountain-shaped width) of a nose between the right and left lens frames depends on the shape or design of the lens frame, but is in the range from about 14 mm to about 19 mm. The nose pad parts of general vision correction glasses do not protrude from the glasses frame in terms of design and are disposed in the upper portion of a nose, that is, near the edges of the eyes in many cases.

Therefore, when it is supposed that the glasses-type liquid crystal shutter holder 100 is mounted on top of the general vision correcting glasses, there is prepared the glasses-type liquid crystal shutter holder 100 slightly larger than the frame of the vision correcting glasses and the shapes and formed positions of the nose pad parts 110 with a saddle shape are configured to be optimum. With such a configuration, since the touching positions of the nose pad parts 110 of the glasses-type liquid crystal shutter holder 100 against the nose can be set so as not to interfere with the vision correcting glasses, the user can wear the glasses-type liquid crystal shutter holder 100 and the vision correcting glasses in an overlapping manner.

In FIG. 12, a distance c is the distance between the apex of the cornea of a user wearing the vision correcting glasses and the rear surface of the lens. The general standard value in the vision correction is 12 mm. In FIG. 12, a distance d is the distance of the temple between the rear surface of the lens of the vision correcting glasses and the ear of the user. The adjustment range of the width of the temple corresponding to the width of the head of the user is generally in the range from 20 mm to 80 mm and is preferably about 40 mm. In order to correspond to this distance, a temple made of a relatively expensive alloy material or a resin material having elasticity is used in many typical vision correction glasses. In this embodiment, the user wears the glasses-type liquid crystal shutter holder 100 on his or her head by adjusting the widths of the temples and the nose pad parts 110. At this time, constriction pressure can become uniform through rough adjustment of the widths of the temples to correspond to the width of the head and the minute adjustment of the nose pad parts 110 through an individual user. Moreover, the wearing sensation (fitting sensation) can be considerably improved. The right and left temples of the vision correcting glasses may not be necessarily parallel to each other and the widths of the temples may become larger toward the ear (the rear part of the face) in accordance with the width of the face of the user wearing the vision correcting glasses. The front ends (modern) of the temples may be curved inward rather than being a straight line and fitting may be realized toward the rear part of the head in many cases.

The fitting of adjusting the vision correcting glasses suitable for the user is performed by (1) adjusting the positions of the right and left temples to the positions of the nose pads, (2) carrying out adjustment up to the nose pads or the ears of the temples, (3) adjusting the inclination angles of the lenses, and (4) disposing the centers of the lenses to a given position of the frame.

There are vision correcting glasses in which the material of the temple is configured to set the appropriate positions of the lenses by the adjustment of the temples and the adjustment of the right and left nose pads and an elastic member made of titanium alloy or Ni—TI based memory alloy with a small coefficient of elasticity is used. Moreover, there are vision correcting glasses in which this elastic member is combined with super-elastic plastic (crystal-imide resin) with flexibility and durability or noncrystalline thermoplastic (polyetherimide resin) with large coefficient of elasticity. Thus, there are vision correcting glasses in which a method or a material having the effect of lessening stress is used so as to flexibly curve the temple without folding the temples.

However, it is supposed that the fitting in the vision correcting glasses is carried out by a manufacturer or in a store and is carried out for a specific single user in terms of the vision correcting glasses. Therefore, the fitting is performed so as to be customized for an individual user by, so to speak, gauging.

The glasses-type liquid crystal shutter holder 100 according to this embodiment is sold together with a 3D television as a set. Therefore, for example, when the glasses-type liquid crystal shutter holder 100 is used at home, a plurality of users with various sizes of the heads shares the glasses-type liquid crystal shutter holder 100 regardless of an adult, a child, a male, and a female. Since it is supposed that the user wears the vision correcting glasses, that is, the user wears two types of glasses, the glasses-type liquid crystal shutter holder 100 according to this embodiment overlaps with each pair of vision correcting glasses during use.

Therefore, the opening angle of the temple is configured to be adjusted step by step by the above-described ratchet type adjustment mechanism, the temple itself is configured so as to be plastic-deformable, and the fitting is carried out so as to be optimum for the users with various sizes of the heads regardless of an adult, a child, a male, and a female.

Figure 9:
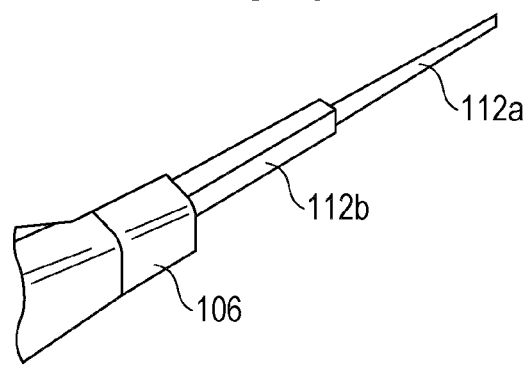
FIG. 9 is an exploded perspective view of the configuration of the temple.

FIG. 9 is an exploded perspective view of the configuration of the temple 112. Regarding the material of the temple 112, a spring material 112a such as stainless steel is provided as a core material in the temple 112. In order to improve the fitting sensation, the temple has a structure in which the spring material 112a is covered with a resin material 112b such as elastomer. The spring material 112a and the resin material 112b can be integrally molded with the temple holder 106. Thus, the temple 112 is plastic-deformable when the user curves the temple 112 with his or her hands. In addition, when the temple 112 is plastic-deformed in a desired shape, the temple 112 can be elastically deformed in the range in which the curve of the temple 112 is returned. Accordingly, for example, when the user wears the glass-type liquid crystal shutter holder 100 by the plastic deformation up to the width slightly smaller than the width of his or her head, the shape of the temple 112 is slightly returned due to the elastic deformation. Therefore, the temple can be maintained along the head by elasticity. The widths of the temples are adjusted in two to four steps by rotating the rotational member 114, as described above, together with the deformation of the temple 112. Thus, the users with different sizes of the heads can minutely adjust the widths of the temples so as to feel the optimum wearing sensation. When the spring material 112a such as stainless steel is used as the core material, the manufacturing cost can be reduced without using an expensive material used in general glasses. Moreover, a hole, a notch, or the like may be formed in the spring material 112a in order to facilitate the plastic deformation.

Figure 13:
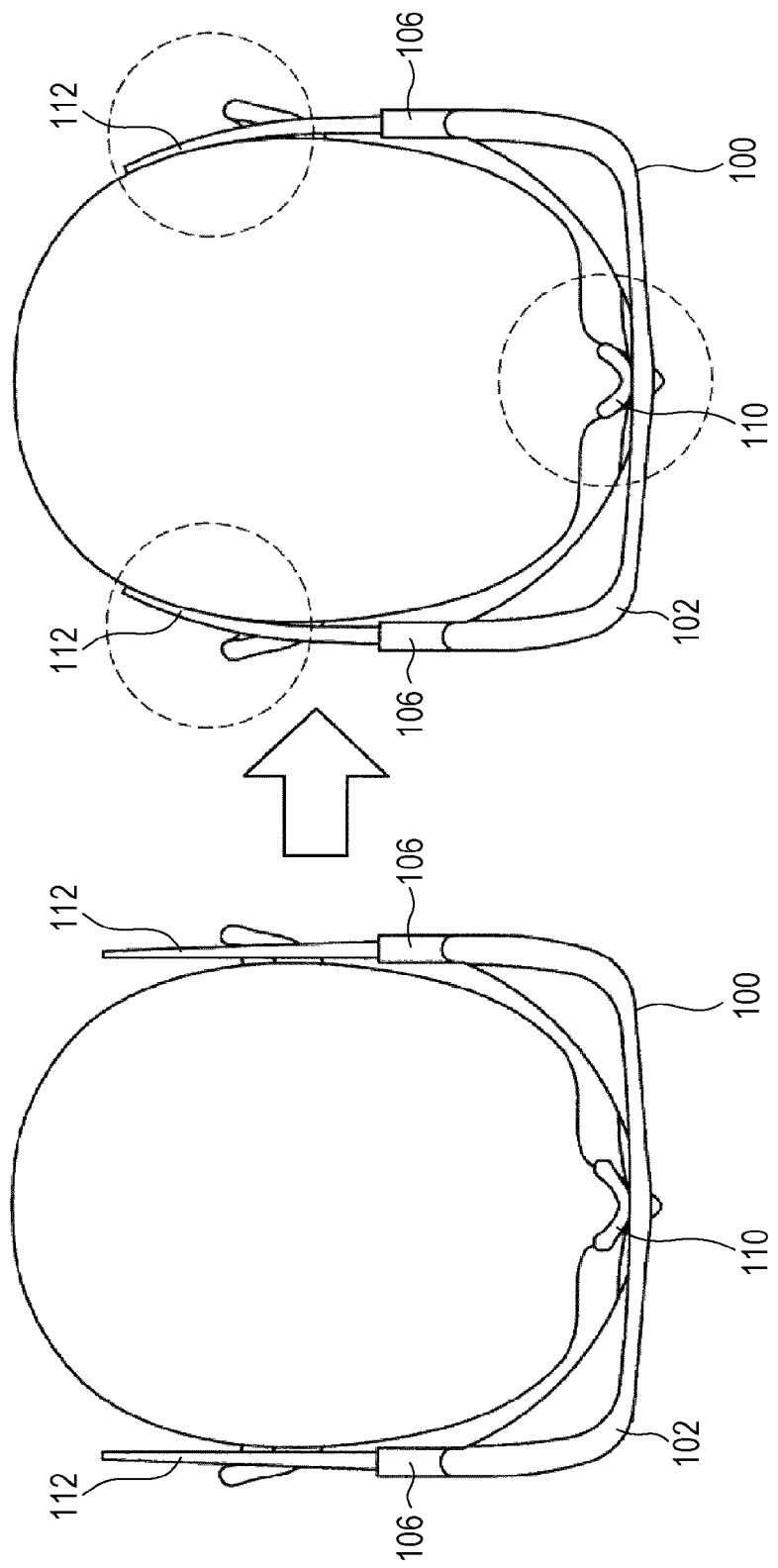
FIG. 13 is a schematic diagram of the glasses-type liquid crystal shutter holder which a user wears.
Figure 14:
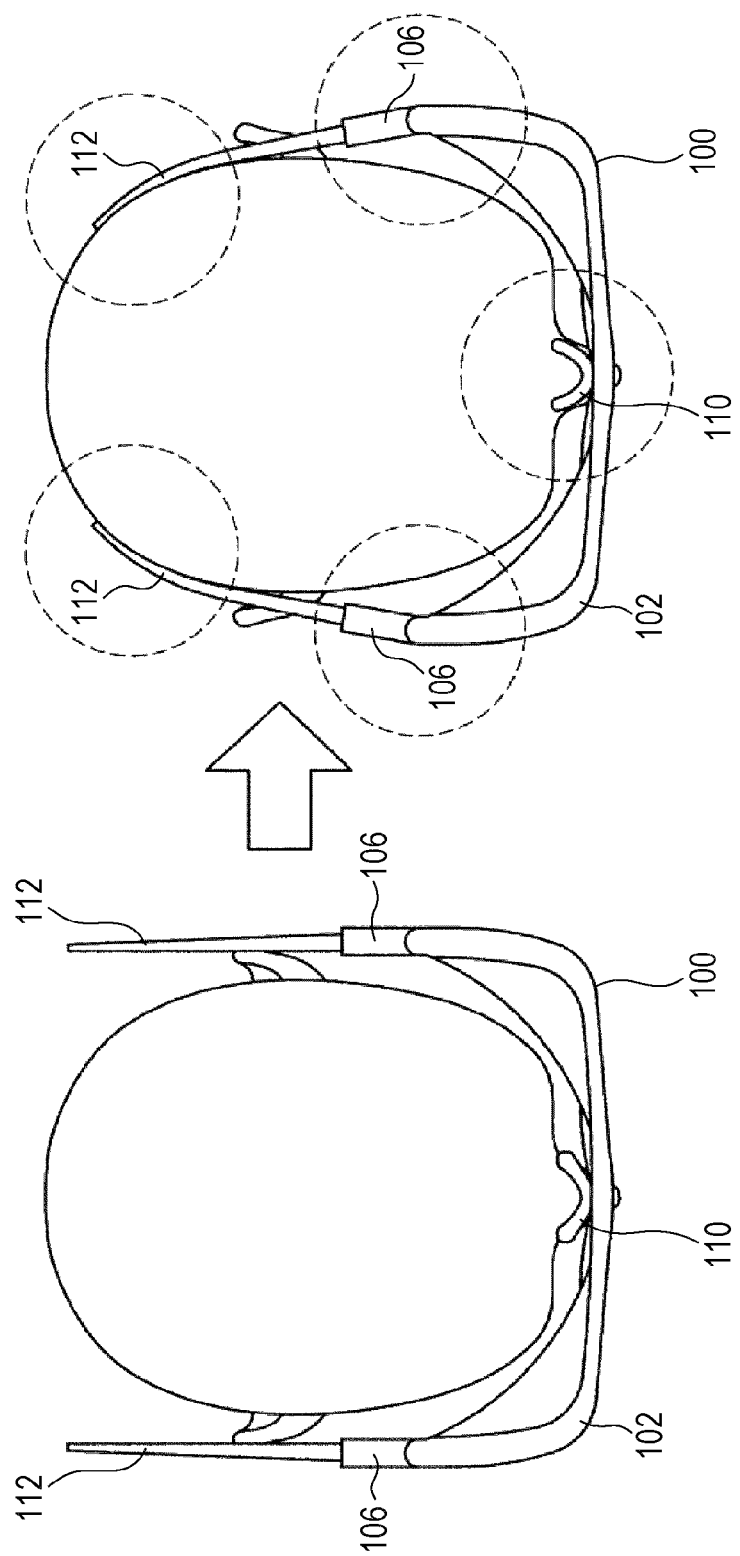
FIG. 14 is a schematic diagram of the glasses-type liquid crystal shutter holder which a user wears.

FIGS. 13 and 14 are schematic diagrams of the glasses-type liquid crystal shutter holder 100 which a user wears, when viewed on top of the head of the user. In the left parts of FIGS. 13 and 14, states are illustrated in which the temples 112 and the nose pad parts 110 are not fitted. In the right parts of FIGS. 13 and 14, the states are illustrated in which the temples 112 and the nose pad parts 110 are deformed so as to fit the head and nose of a user.

In FIG. 13, the illustrated user is an adult and the size of his or her head is the size of a typical adult. In this case, the protrusions of the rotational members 114 are located at the positions corresponding to the deepest portions of the grooves 116 and the opening angle of the temples 112 is the maximum. The user wears the glasses-type liquid crystal shutter holder 100 on his or her head, and then curves the temples 112 following the contours of his or her head. Then, when the user is an adult, the glasses-type liquid crystal shutter holder 100 can be fitted optimally on his or her head.

In FIG. 14, the illustrated user is a child and the size of his or her head is relatively small. In this case, the protrusions of the rotational members 114 are located at the positions at which the grooves 116 are not formed and the opening angle of the temples 112 is the minimum. The user wears the glasses-type liquid crystal shutter holder 100 on his or her head, and then curves the temples 112 along his or her head. Then, when the user is a child, the widths of the temples can be sufficiently made to be reduced and the glasses-type liquid crystal shutter holder 100 can be fitted optimally on his or her head.

The nose pad parts 110 with the saddle shape are configured to come into contact with the nose at the positions lower than the positions of the nose pad parts 302 of typical glasses. Thus, it is possible to prevent the nose pad parts 302 of the vision correcting glasses and the nose pad parts 110 of the glasses-type liquid crystal shutter holder 100 from interfering with each other. Moreover, it is possible to realize the structure in which both the nose pad parts 110 and 302 reliably come into contact with the nose.

In the glasses-type liquid crystal shutter holder 100 according to this embodiment, the nose pad part 110 with the saddle shape has a double structure having a core material and a covering material, like the temple 112. A spring material such as stainless steel is used as the core material and the surface of the core material is covered with a resin material such as elastomer. Thus, the nose pad parts 110 are freely deformable as well as being normally deformed and being deformed due to torsion. The user can carry out optimal fitting by optimally deforming the nose pad parts 110.

Figure 15:
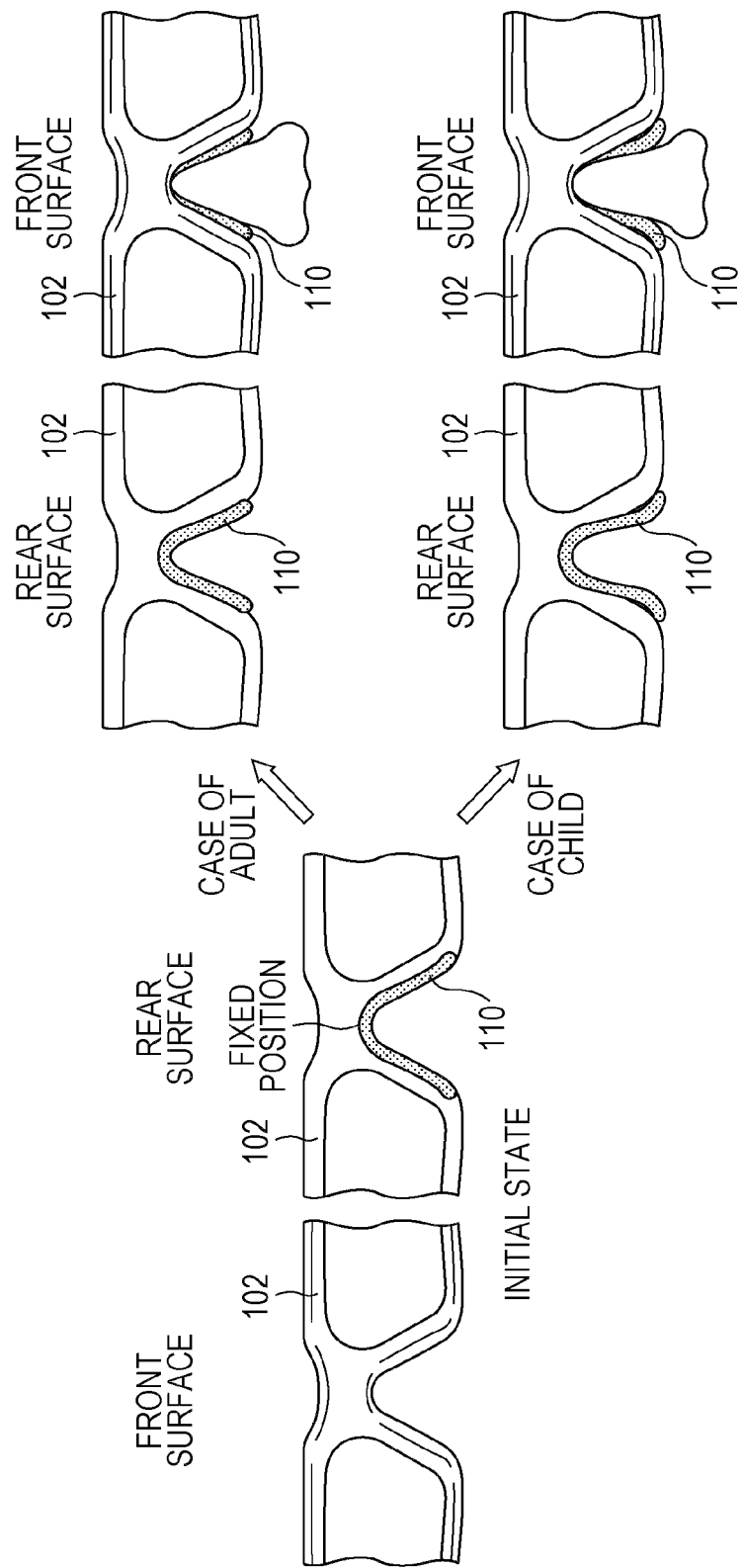
FIG. 15 is a schematic diagram of the front surface and the rear surface of the vicinities of nose pad parts of the glasses-type liquid crystal shutter holder.

FIG. 15 is a schematic diagram of the front surface and the rear surface (the surface coming into contact with a face) of the vicinities of the nose pad parts 110 of the glasses-type liquid crystal shutter holder 100. The nose pad parts 110 are fixed to the glasses frame 102 in the vicinity of a fixing position shown in FIG. 15. When the user is an adult and the size and width of his or her nose is relatively large (when the size of his or her nose is the size of a typical adult), the nose pad parts 110 can be fitted on his or her nose by adjusting the opening angles of the nose pad parts 110 to a large scale to match with the width of his or her nose.

Alternatively, when the user is a child and the size and width of his or her nose is relatively small, the nose pad parts 110 can be fitted on his or her nose by adjusting the opening angles of the nose pad parts 110 to a small scale to match with the width of his or her nose.

A position hb of the front ends of the nose pad parts 110 shown in FIG. 11 and a depth hc of the front ends of the nose pad parts 110 shown in FIG. 12 can be adjusted by adjusting the opening angles of the nose pad parts 110. Thus, when the user wears the glasses-type liquid crystal shutter holder 100 on top of the vision correcting glasses, it is possible to prevent the nose pad parts 302 of the vision correcting glasses and the nose pad parts 110 of the glasses-type liquid crystal shutter holder 100 from interfering with each other. Moreover, it is possible to set the adequate position of the glasses-type liquid crystal shutter holder 100 vertically.

Figure 16:
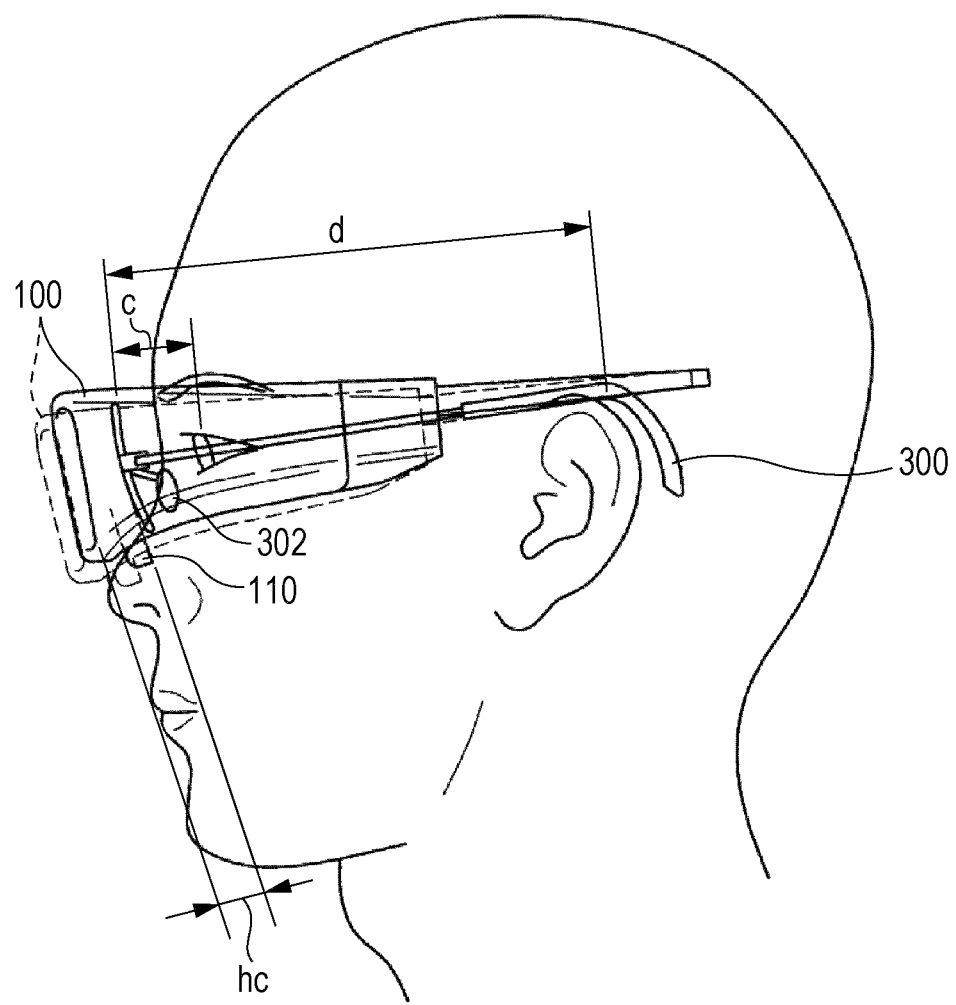
FIG. 16 is a schematic diagram of a case in which no mechanism adjusting the opening angle of the nose pad part is provided according to a comparative example.

FIG. 16 is a diagram of a case in which no mechanism adjusting the opening angle of the nose pad part 110 is provided according to a comparative example. In this case, when the position of the glasses-type liquid crystal shutter holder 100 is put forward in order not to interfere with the vision correcting glasses, a problem may arise in that the glasses-type liquid crystal shutter holder 100 descends downward. In this case, since the position of the opening of the liquid crystal shutter is deviated downward, a problem may arise in that a part of the image on the display is omitted.

In the glasses-type liquid crystal shutter holder 100 according to this embodiment, the nose pad part 110 is set to be sufficiently lengthened so as to adjust the opening angle of the nose pad part 110. Therefore, even when the glasses-type liquid crystal shutter holder 100 is detached from the vision correcting glasses, it is possible to match the position of the liquid crystal shutter with the optical axis by adjusting the width ha of the front end of the nose pad part 110, the position hb of the front end of the nose pad part 110, and the depth hc of the front end of the nose pad part 110.

The width ha of the nose pad parts 110 is configured to be larger than that of the nose pad parts 302 of the vision correcting glasses in order to prevent the interference with the vision correcting glasses. Here, the gap (a gap b shown in FIG. 11) between the nose pad parts 302 of the vision correcting glasses is configured to be in the range from about 16 mm to about 18 mm which is the value of the average nose width. As for the glasses for a child, the nose width is in the range from about 14 mm to about 15 mm. As for the glasses for an infant, the nose width is about 12 mm. Therefore, by enabling the width ha to be set to 12 mm or more, the users from an adult to a child can wear the glasses-type liquid crystal shutter holder 100 on top of all kinds of vision correcting glasses.

In order to wear glasses-type liquid crystal shutter holder 100 on top of the vision correcting glasses, the size of the glasses-type liquid crystal shutter holder 100 has to be larger than the standard size of the vision correcting glasses holder. Therefore, since it is necessary to lower the positions of the portions of the nose pad parts 110 corresponding to the nose, the width ha of the front end of the nose lower part is about 20 mm. The front end of the nose lower part is located at the position of about 25 mm (=hb) so as to be lower than the optical axis. Since the standard value of the distance between the surface of the cornea and the rear surface of a typical glasses lens is 12 mm, the distance from the surface of the cornea is set to be 13 mm (=hc) or more. Therefore, the user can wear the vision correcting glasses and the glasses-type liquid crystal shutter holder in the double overlapping manner. In this embodiment, a preferable value of the height of the rear surface of the glasses-type liquid crystal shutter holder 100 is a value which is not the height of the glasses lens and frame. It is necessary to consider the relationship with the habitual wearing position of the user wearing typical vision correcting glasses. However, even when the optical axis is minutely deviated from that of the glasses due to the relationship between the positions of the larger glasses-type liquid crystal shutter holder 100 and the nose pad parts 110, there is no problem with the performance when the user views a stereoscopic image.

By utilizing the above-described structure, it is possible to satisfy all of an adult, a child, a male, and a female with one glasses-type liquid crystal shutter holder 100. Moreover, even the user wearing the vision correcting glasses or the users with different sizes of their heads can easily wear the liquid crystal shutter glasses for viewing a stereoscopic image and can feel the improved wearing sensation by adjusting the widths of the temples in two to four steps and using the minute adjustment mechanism through the use of the rotational ratchet mechanism or the slide mechanism without using an expensive material. Due to the effects of the adjustment of the ratchet mechanism for the width of the temple in step manner and the spring property of the temple itself, the optimization for individual users can be achieved for the width of head which is in the range from about maximum 175 mm to about 140 mm from the male adult to a female adult (child).

When the user normally wears or takes off his or her glasses, it is possible to adjust the end portions (modern portions) of the temples 112 so as to be suitable for the curve of the head or the curve of the ears while preventing the permanent plastic deformation of the temples 112. Accordingly, the user can easily carry out the adjustment or the like by himself or herself.

According to this embodiment, as described above, the temple corresponding to an ear hooking part includes a hinge portion and rotational ratchet mechanism and it is possible to vary the width of the temple coming into contact with the head in a step manner. The rotational member 114 changing the width of the temple is provided with the protrusion 114a. The groove 116 with the depths changed in a step manner is formed in the corresponding surface. By changing the angle of the rotational member 114, the attachment angle between the angle frame 102 and the temple 112 can be switched in a step manner. With such a configuration, the user can easily carry out the step adjustment from the initial shape to the suitable size from about the maximum 175 mm to about 140 mm of the average width of the heads of the users by himself or herself. Moreover, a plurality of users with different widths of their heads can use only the accessory of one glasses-type liquid crystal shutter holder.

In the temples 112 of the glasses frame 102, the spring material 112a, such as stainless steel, having the spring property is used as the core material and the surface of the spring material 112a is covered with the soft resin 112b. Therefore, the minute adjustment of the shape can be achieved by applying a load to the temple 112 so as to be plastic-deformable. Thus, the user can achieve the minute adjustment to improve the wearing sensation by himself or herself without using an expensive material or using a specialized technique, a special device, or a jig necessary for performing minute adjustment of typical vision correcting glasses.

4. Another Example of Configuration of Shutter Glasses

Figure 17:
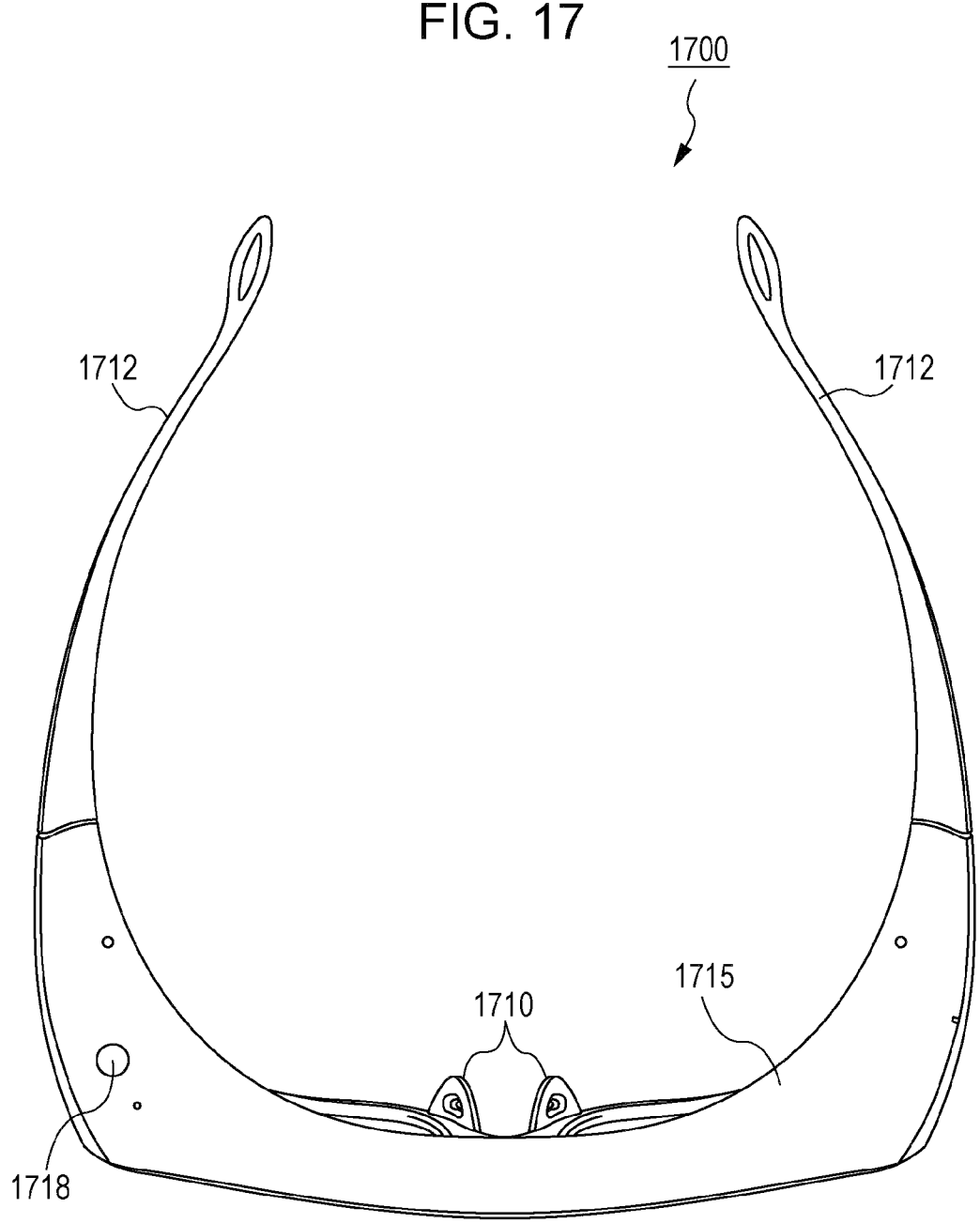
FIG. 17 is a top view of the glasses-type liquid crystal shutter holder when viewed from the upper side.
Figure 18:
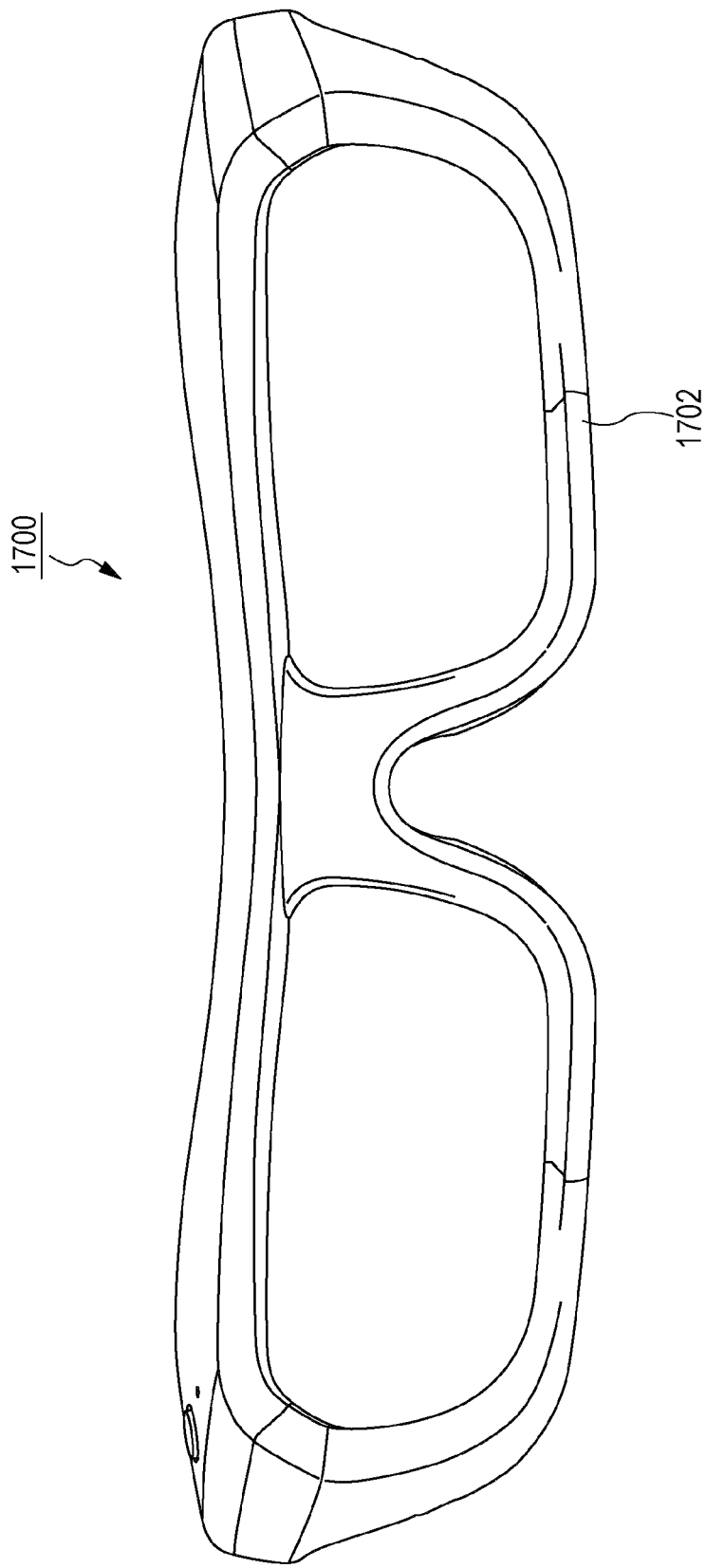
FIG. 18 is a front view of the glasses-type liquid crystal shutter holder.
Figure 19:
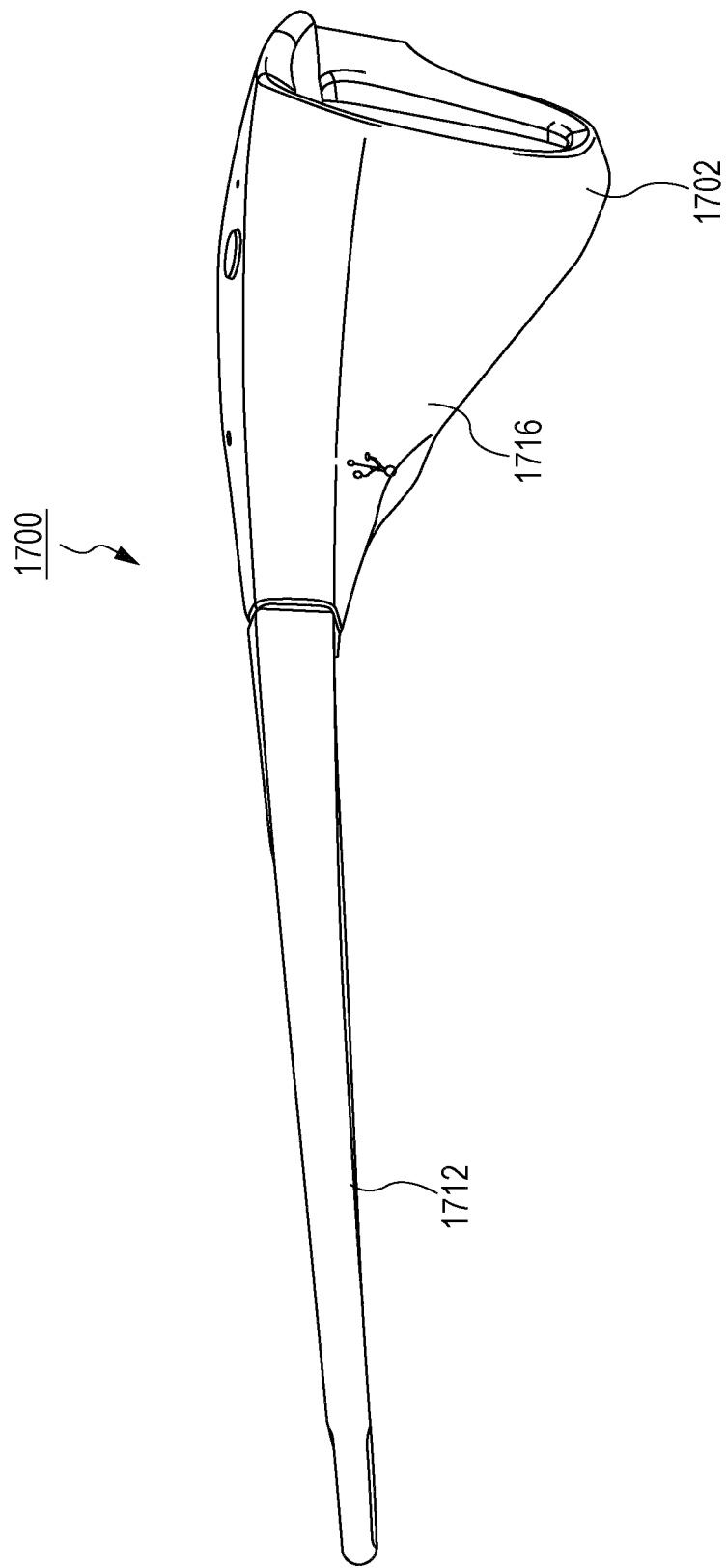
FIG. 19 is a right side view of the glasses-type liquid crystal shutter holder.
Figure 20:
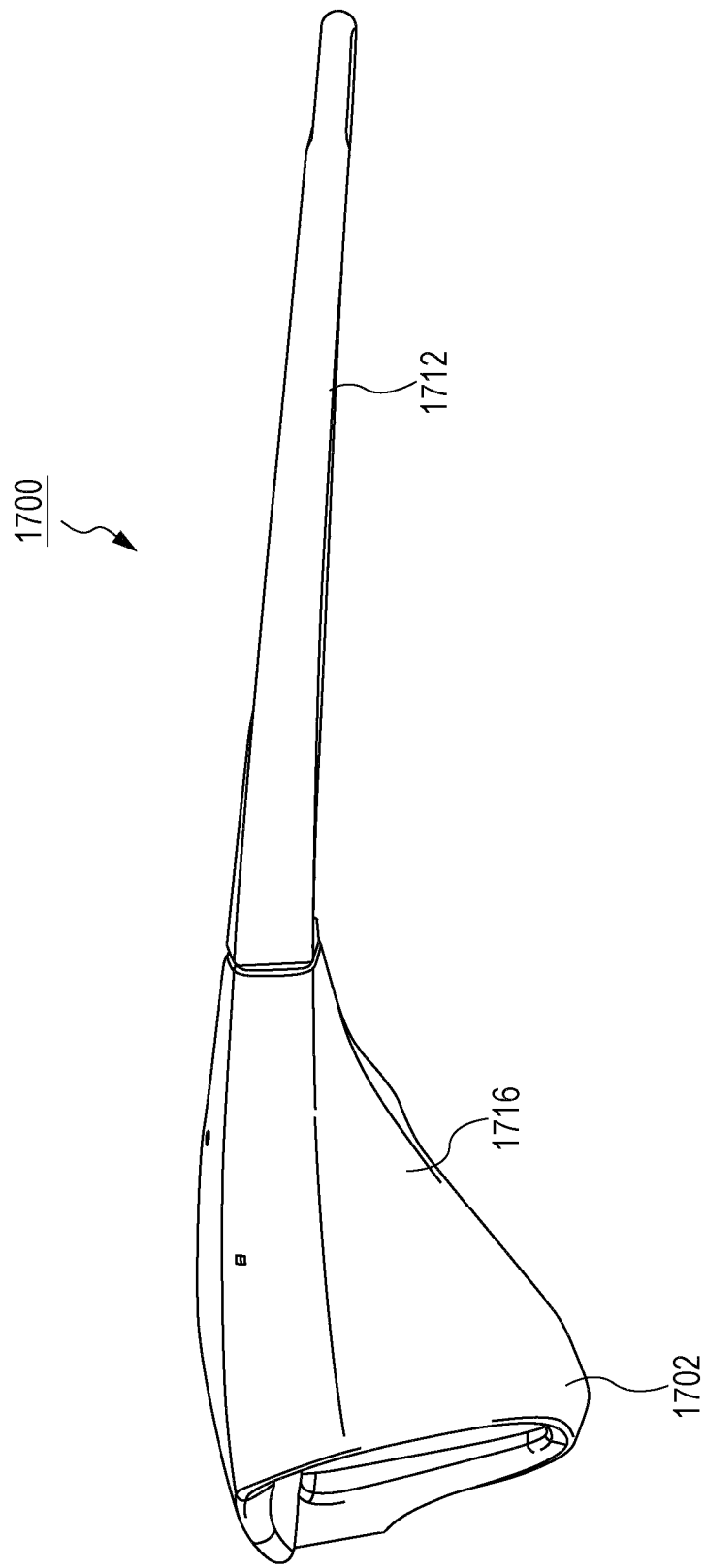
FIG. 20 is a left side view of the glasses-type liquid crystal shutter holder.
Figure 21:
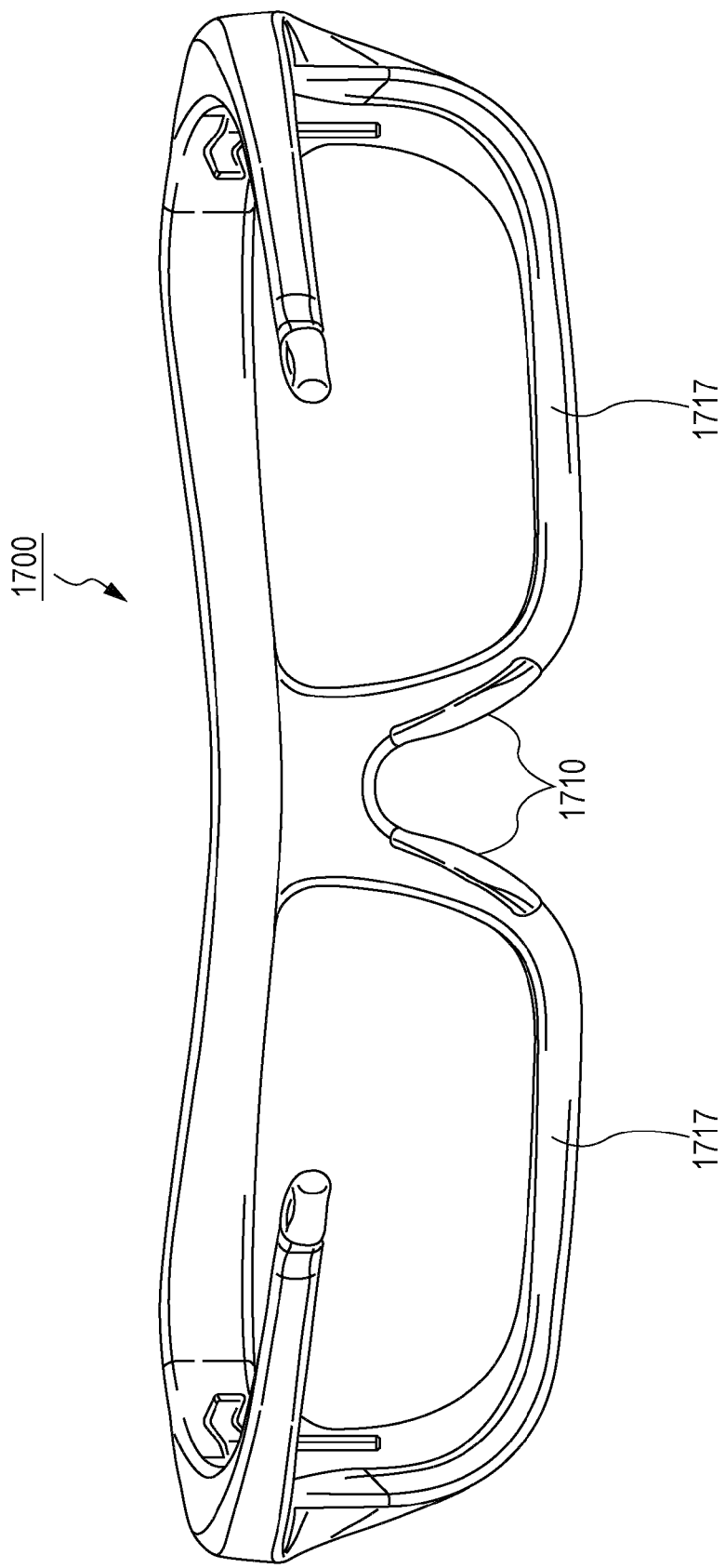
FIG. 21 is a rear view of the glasses-type liquid crystal shutter holder, when viewed from the rear side.
Figure 22:
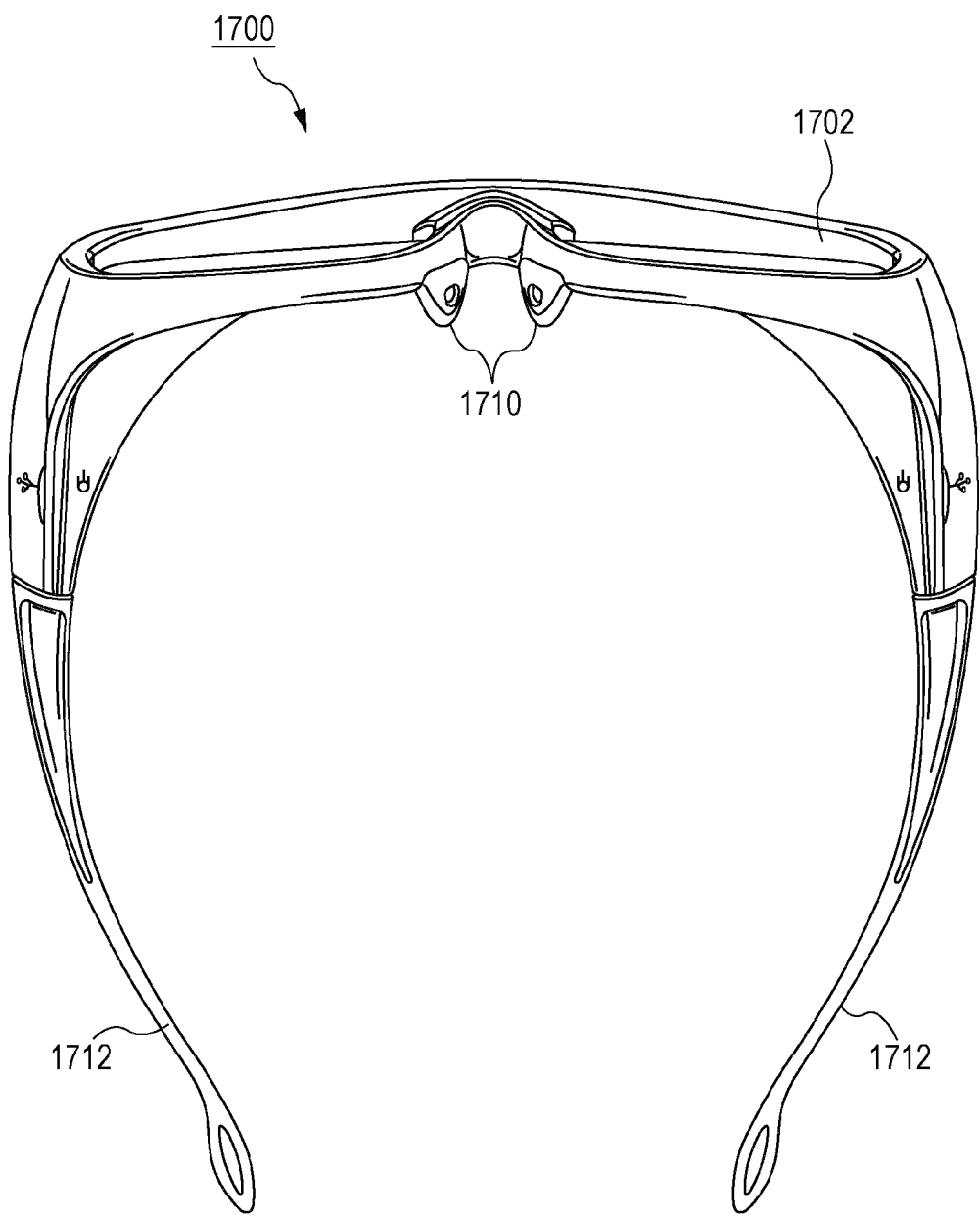
FIG. 22 is a bottom view of the glasses-type liquid crystal shutter holder, when viewed from the lower side.

In FIGS. 17 to 22, the configuration of a glasses-type liquid crystal shutter holder (liquid crystal shutter glasses) 1700 is schematically illustrated according to another embodiment of the disclosure. A user wears the illustrated glasses-type liquid crystal shutter holder 1700 on his or her head, when the user views a display (display device) displaying right and left eye images and right eye images to view a 3D (stereoscopic) image. In the glasses-type liquid crystal shutter holder 1700, two liquid crystal shutters capable of alternately switching polarization states in synchronization with right and left images are accommodated in a glasses frame 1702. The glasses-type liquid crystal shutter holder 1700 has an infrared detection unit detecting infrared rays transmitted from a display (not shown), a liquid crystal shutter driving circuit, and electric and electronic components, such as a battery driving the circuit. FIG. 17 is a top view of the glasses-type liquid crystal shutter holder 1700 when viewed from the upper side. FIG. 18 is a perspective view of the glasses-type liquid crystal shutter holder 1700. FIG. 19 is a right side view of the glasses-type liquid crystal shutter holder 1700. FIG. 20 is a left side view of the glasses-type liquid crystal shutter holder 1700. FIG. 21 is a rear view of the glasses-type liquid crystal shutter holder 1700. FIG. 22 is a bottom view of the glasses-type liquid crystal shutter holder 1700.

The user wears the glasses-type liquid crystal shutter holder 1700 according to this embodiment to overlap on top of typical vision correcting glasses. Moreover, the glasses-type liquid crystal shutter holder 1700 is configured so that users from an adult to a child with various head types and various sizes of faces can wear the glasses-type liquid crystal shutter holder 1700.

The glasses frame 1702 includes right and left rims holding the liquid crystal shutter so as to surround the circumference and a bridge connecting the rims to each other. The glasses frame 1702 is molded of a resin material. Both end portions (armors) of the glasses frame 1702 are formed so as to have a curved surface. The right and left end portions of the frame are connected to right and left temples 1712 via hinge portions, respectively. Each temple 1712 can be folded through the hinge portion.

As understood from the upper part of FIG. 17, a parallel upper shading part 1715 protruding to the rear side is attached to the upper edge of the glasses frame 1702. The upper shading part 1715 serves as a brim part. The upper shading part 1715 covers the upper portion of the glasses frame 1702 and shades the outside light incident from the upper side.

As understood from the right and left side views of FIGS. 19 and 20, lateral shading parts 1716 protruding to the rear side along the temple 1712 are attached to the right and left end portions (armors) of the glasses frame 1702. The lateral shading parts 1716 serve as a brim part. The lateral shading parts 1716 cover the right and left lateral faces of the glasses frame 1702 and shade the outside light incident from the lateral faces.

Thus, since the upper shading part 1715 and the lateral shading parts 1716 prevent the outside light from being incident on the eyes, the user wearing the glasses-type liquid crystal shutter holder 1700 can focus on a stereoscopic image to view the stereoscopic image. Here, the outside light includes illuminated light such as fluorescent light as well as natural light such as sunlight. Since the upper shading part 1715 and the lateral shading parts 1716 block illuminated light, it is possible to obtain the advantage of preventing flicker caused due to illuminated light which is uniform in a polarization light direction of a stereoscopic image difference.

In FIG. 21, Reference Numeral 1717 denotes a circumferential portion of a shutter lens. When this circumferential portion is configured to be black or another color easily absorbing light, the user can further focus the image.

When the embodiment of FIG. 17 is compared to the embodiment of FIGS. 1 to 5, the upper shading part 1715 of the glasses-type liquid crystal shutter holder 1700 has a broad bottom area. When the bottom area of the upper shading part 1715 is broad, not only the advantage of preventing the outside light can be obtained, but also the bottom space can be used as a place for accommodating electric and electronic components such as a liquid crystal shutter driving circuit, a battery driving the circuit, and an infrared signal processing circuit. On the contrary, when the upper shading part 1715 is narrow, for example, the electric and electronic components have to be mounted in the lateral surface such as the lateral shading parts 1716 and the horizontal width of the glasses-type liquid crystal shutter holder may be considerably increased. Therefore, the smaller and compact glasses-type liquid crystal shutter holder 1700 having the horizontal width can be configured according to the embodiment shown in FIG. 17 and the like.

When the electric and electronic components such as a liquid crystal shutter driving circuit, a battery driving the circuit, and an infrared signal processing circuit are accommodated inside the upper shading part 1715, the heavy load is disposed on the front side and thus the center of gravity of the entire glasses-type liquid crystal shutter holder 1700 leans to the front side.

The mounting of the circuit inside the upper shading part 1715 will be described in detail below.

As understood from FIG. 17, a power button 1718 is disposed on the upper surface of the upper shading part 1715. When the power button 1718 is turned on, power is input to the liquid crystal shutter driving circuit and the operations of the right and left liquid crystal shutters start. Then, the user wearing the glasses-type liquid crystal shutter holder can view the stereoscopic image. For example, information regarding the ON/OFF timing of the right and left liquid crystal shutters is given through an infrared signal from the display device which displays the stereoscopic image (which is well-known).

When the power button 1718 is disposed on the upper surface of the upper shading part 1715 or the upper surface of the rim of the glasses frame 1702, the user can easily search for the position of the power button 1718. Moreover, even when the user wears the glasses-type liquid crystal shutter holder 1700 and presses down the power button 1718, a reactive force is obtained from the nose pad parts 1710 or the temples 1712. Therefore, the position at which the user wears the glasses-type liquid crystal shutter holder 1700 is not deviated. On the other hand, in a case where the power button is disposed on the lateral surface or the bottom surface of the glasses-type liquid crystal shutter holder, it is difficult for the user to operate the power button when the user presses down the power button. This is because the glasses-type liquid crystal shutter holder moves to the right, left, upper, or lower side.

The bottom area of the upper shading part 1715 is broad. Therefore, when the user wears the glasses-type liquid crystal shutter holder 1700 on top of typical vision correcting glasses in the overlapping manner, the upper shading part 1715 is located on the glasses frame of the vision correcting glasses and the glasses-type liquid crystal shutter holder 1700 is supported by the vision correcting glasses located below. At this time, the weight of the glasses-type liquid crystal shutter holder 1700 is distributed to the nose pad parts and the glasses frame 1702. Therefore, since the user scarcely feels the weight of the glasses-type liquid crystal shutter holder 1700, the user can have a good wearing sensation.

As understood from the right and left side views of FIGS. 19 and 20 and the rear view of FIG. 21, the hinge portions are disposed in the upper sections of both ends (armors) of the glasses frame 1702 and the temples 1712 extend from the upper sections of the glasses frame 1702 toward the rear side. Therefore, when the user wears the glasses-type liquid crystal shutter holder 1700 on top of the typical vision correcting glasses in the overlapping manner, the height of the temples 1712 is different from that of the vision correcting glasses located inward. Therefore, the temples of the glasses-type liquid crystal shutter holder 1700 do not interfere with the temples of the vision correcting glasses. Accordingly, the user can wear the glasses-type liquid crystal shutter holder 1700 on top of the vision correcting glasses in the double overlapping manner.

The temple 1712 is preferably made of a lightweight material which is difficult to fold. An example of this material is a nylon-based material such as Grilamid (trademark). In this case, when the user wears the glasses-type liquid crystal shutter holder 1700, the temples 1712 are appropriately curved. Therefore, the wearing sensation is good and the temples are barely folded even when the user forcibly curves the temples. Accordingly, even when no mechanism adjusting the width of the temple is provided, a temple spring pressure can be applied so that the users with the different sizes of their heads can stably wear the glasses-type liquid crystal shutter holder 1700 regardless of a male, a female, an adult, and a child by curving of the right and left temples 1712 without feeling discomfort.

As understood from the top view of FIG. 17, the rear view of FIG. 21, and the bottom view of FIG. 22, a pair of nose pad parts 1710 are disposed inside the right and left rims of the glasses frame 1702. In this embodiment, as illustrated, the nose pad parts 1710 are made of a rubber material and have no metal core. The nose pad parts 1710 are configured to be thin and accomplish the original function of the nose pad part. When the user wears the glasses-type liquid crystal shutter holder on top of the typical vision correcting glasses in the overlapping manner, the nose pad parts 1710 avoid the nose pad parts of the vision correcting glasses (the nose pad parts 1710 come into contact with the nose at the position lower than the positions of the nose pad parts of the vision correcting glasses). As understood from FIGS. 17 and 22, holes are opened in the nose pad parts 1710. The nose pad parts 1710 are lighter and more flexible than the nose pad parts with no hole.

Figure 23:
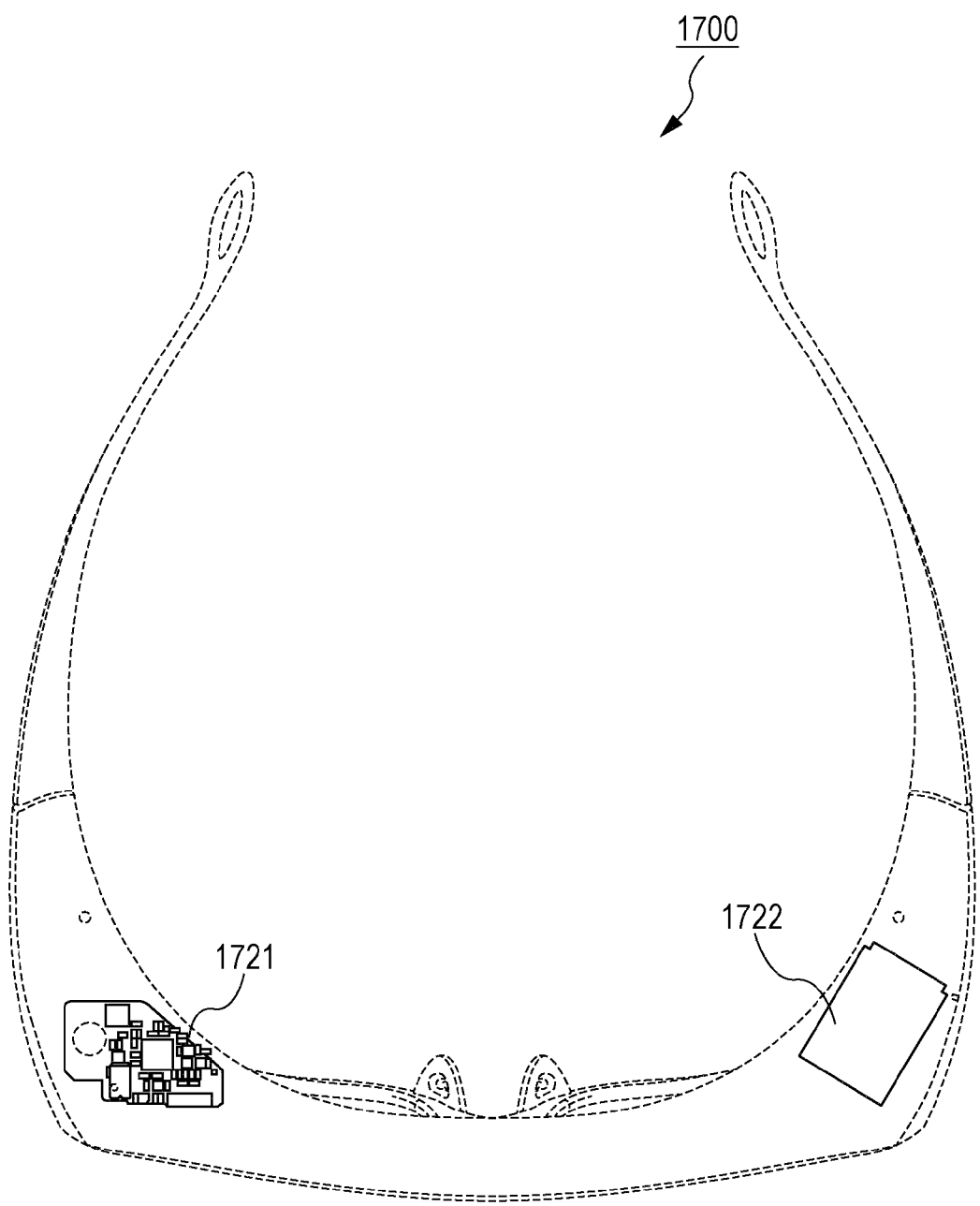
FIG. 23 is a top view of circuit components mounted inside an upper shading part, when viewed from the upper side.
Figure 24:
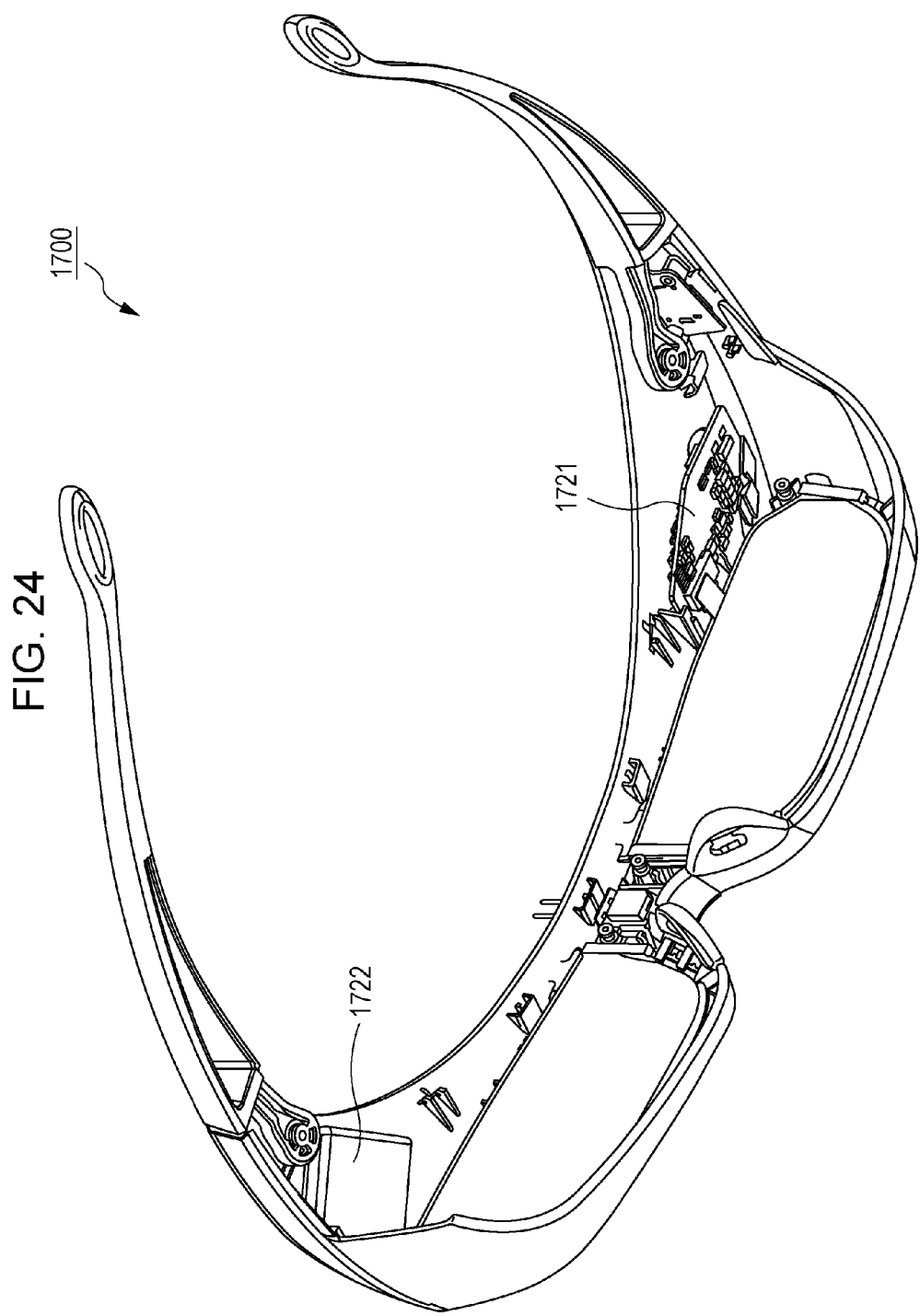
FIG. 24 is a perspective view of the circuit component mounted inside the upper shading part, when viewed from the left lower side.

FIG. 23 is a top view of circuit components mounted inside the upper shading part 1715, when viewed from the upper side. FIG. 24 is a perspective view of the circuit components mounted inside the upper shading part 1715, when viewed from the left lower side. As understood from the drawings, a liquid crystal shutter driving circuit 1721 is disposed on the right side of the upper shading part 1715 and a battery 1722 driving a circuit is disposed on the left side of the upper shading part 1715. Thus, by separately disposing the weighty circuit components on the right and left sides, the weight of the entire glasses-type liquid crystal shutter holder 1700 can be balanced on the right and left sides.

Thus, when the liquid crystal shutter driving circuit 1721 and the battery 1722 are accommodated inside the upper shading part 1715, the heavy load is disposed on the front side and the center of gravity of the entire glasses-type liquid crystal shutter holder 1700 leans to the front side. When the user wears the glasses-type liquid crystal shutter holder 1700 on top of typical vision correcting glasses in the overlapping manner, the upper shading part 1715 is located on the glasses frame of the vision correcting glasses. At this time, the weight of the glasses-type liquid crystal shutter holder 1700 is distributed to the nose pad parts and the glasses frame 1702. Therefore, since the user scarcely feels the weight of the glasses-type liquid crystal shutter holder 1700, the user can have a good wearing sensation.

In this embodiment, the battery 1722 is configured as a charging type battery. A dedicated charger may be manufactured, but the battery 1722 may be charged via a charging power cable inserted into the glasses-type liquid crystal shutter holder 1700, when the charging power cable is attached to the body of the glasses-type liquid crystal shutter holder 1700.

Figure 25:
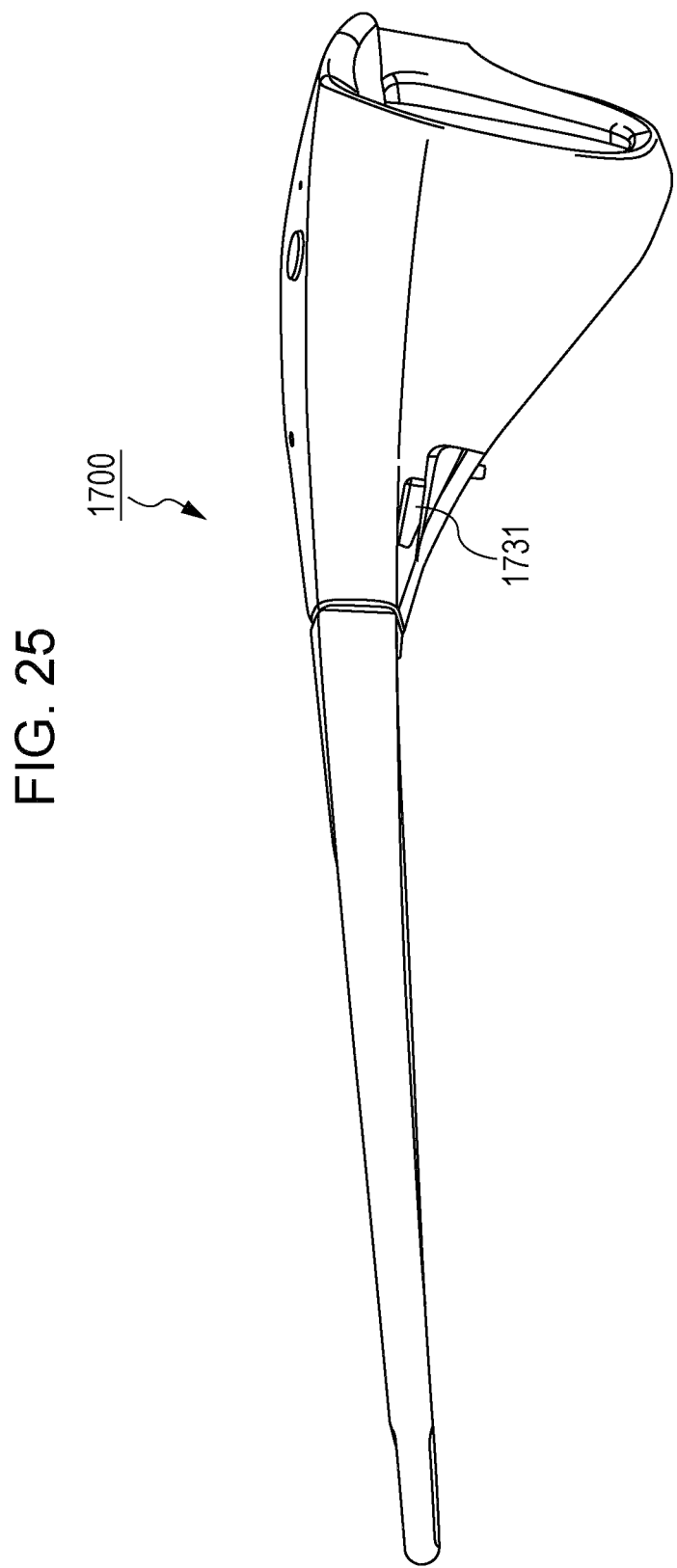
FIG. 25 is a diagram of an insertion port of a power cable when a cover is detached from a lateral shading part.

In this embodiment, an insertion port of the power cable is formed in the right lateral shading part 1716. When a cover is detached from the lateral shading part 1716, as shown in FIG. 25, an insertion port 1731 of the power cable can be seen.

Figure 26:
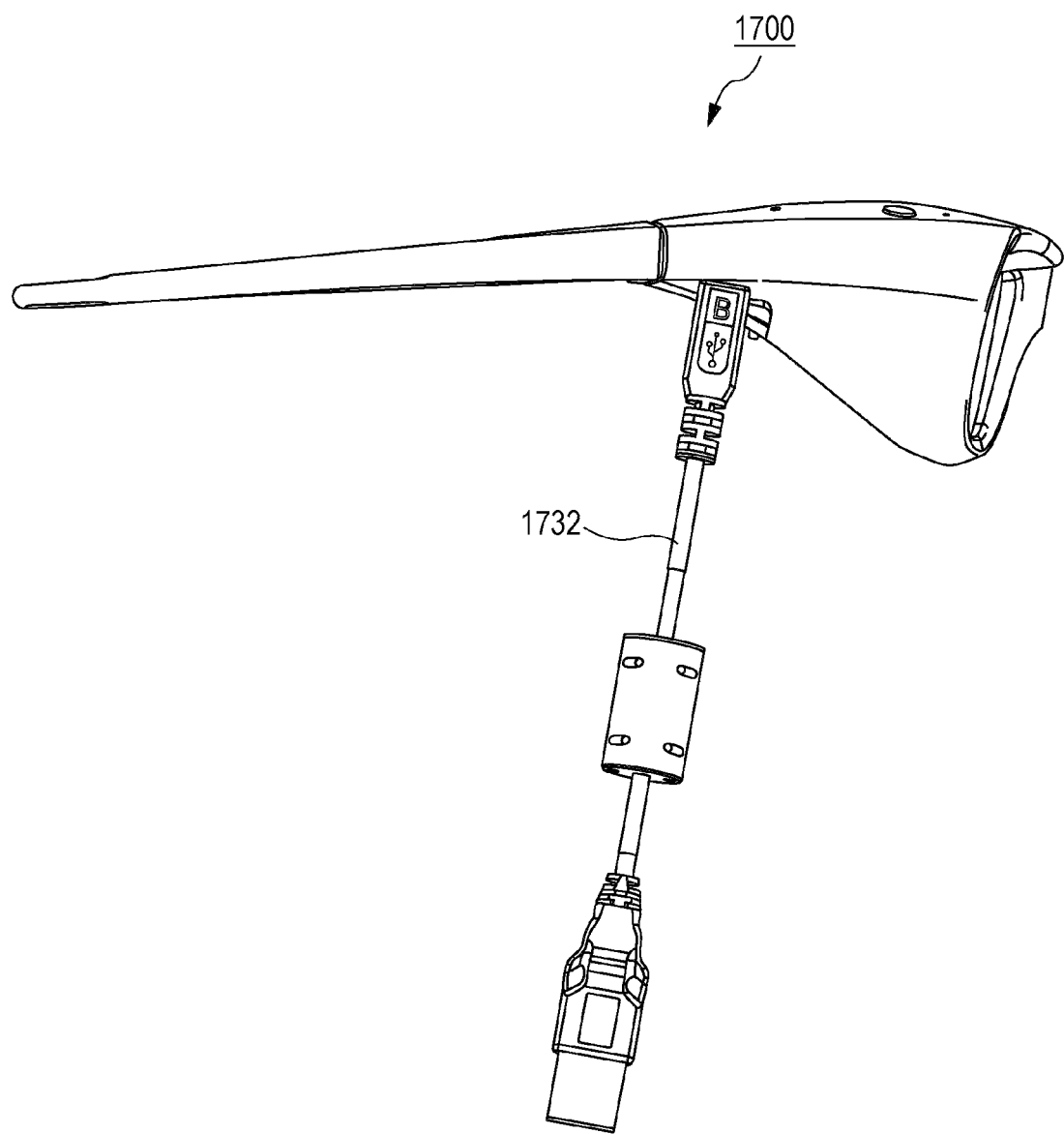
FIG. 26 is a diagram of a power cable inserted into the insertion port formed in the lateral shading part.

FIG. 26 is a diagram of a case where a power cable 1732 is inserted into the insertion port 1731 formed in the lateral shading part 1716. The insertion direction of the power cable into the insertion port 1731 is oriented downward. As shown in FIG. 26, the power cable 1732 inserted into the insertion port 1731 extends from the lower portion of the lateral shading part 1716 to the lower side.

As shown in FIG. 26, the power cable 1732 inserted into the insertion port 1731 is out of the field of vision of the user wearing the glasses-type liquid crystal shutter holder 1700. Accordingly, while the battery 1722 connected to the power cable 1732 is charged, the user can view the image, that is, operation charging can be achieved.

In the example shown in FIG. 26, a USB (Universal Serial Bus) cable is used as the power cable 1732. A device connection B plug of one end of the USB cable is inserted into the insertion port 1731 of the glasses-type liquid crystal shutter holder 1700 and a host connection A plug of the other end of the USB cable is inserted into a USB terminal (not shown) of a host apparatus such as a television receiver or a PC (Personal Computer), so that power can be fed via a power line (VBUS) of the USB cable. The gist of the disclosure is not limited to a specific interface standard.

It should be understood by those skilled in the art that various modifications, combinations, sub-combinations and alterations may occur depending on design requirements and other factors insofar as they are within the scope of the appended claims or the equivalents thereof.

What is claimed is:

1. A glasses-type shutter holder comprising:
    a frame having left and right openings adjacent left and right frame end parts, respectively; and
    left and right temple parts connected respectively to the left and right frame end parts in a configuration such that the left and right temple parts are foldable respectively with respect to the left and right frame end parts in accordance with movement, for each frame end part and temple part pair, of a contact position at which a movement part provided with one of the temple part and the frame end part of the pair is in contact with a contact part of the other of the temple part and the frame end part of the pair,
    wherein, for each of the pairs, (i) the contact part is in contact with the movement part when the temple part is unfolded to a maximum degree, and (ii) a maximum degree of opening of the temple part is varied in accordance with the movement of the movement part along a surface of the other of the temple part and the frame end part of the pair as the contact part.

2. The holder of claim 1, wherein the left and right temple parts include a spring material that is plastically deformable.

3. The holder of claim 1, wherein, for each of the pairs, the movement part is movable in contact with the contact part in a step manner.

4. The holder of claim 1, wherein the frame includes a shutter driving circuit.

5. The holder of claim 1, wherein the frame includes a battery.

6. The holder of claim 1 further comprising:
    a nose pad part attached to the frame, the nose pad part including rubber material and not including a metal core.

7. The holder of claim 1 further comprising:
    a nose pad part attached to the frame at left and right rims of the frame.

\* \* \* \* \*